(12) United States Patent
Yanagisawa et al.

(10) Patent No.: US 12,312,723 B2
(45) Date of Patent: May 27, 2025

(54) CREASING APPARATUS

(71) Applicant: JUKI CORPORATION, Tama (JP)

(72) Inventors: Norio Yanagisawa, Tokyo (JP); Takeshi Asami, Tokyo (JP); Yu Ikoshi, Tokyo (JP)

(73) Assignee: JUKI CORPORATION, Tama (JP)

( * ) Notice: Subject to any disclaimer, the term of this patent is extended or adjusted under 35 U.S.C. 154(b) by 0 days.

(21) Appl. No.: 18/515,756

(22) Filed: Nov. 21, 2023

(65) Prior Publication Data
US 2024/0165906 A1    May 23, 2024

(30) Foreign Application Priority Data

Nov. 22, 2022 (JP) ................................. 2022-186480

(51) Int. Cl.
| | | |
|---|---|---|
| *D05B 35/08* | (2006.01) | |
| *B25J 9/16* | (2006.01) | |
| *D05B 81/00* | (2006.01) | |

(52) U.S. Cl.
CPC ............ *D05B 35/08* (2013.01); *B25J 9/1697* (2013.01); *D05B 81/00* (2013.01); *D05D 2305/02* (2013.01)

(58) Field of Classification Search
CPC ........ D05B 35/08; D05B 81/00; B25J 9/1697; D05D 2305/02
USPC .......................................................... 223/28
See application file for complete search history.

(56) References Cited

U.S. PATENT DOCUMENTS

| | | | | |
|---|---|---|---|---|
| 3,822,034 A * | 7/1974 | Lawson | ................. | A47H 13/14 223/28 |
| 3,824,964 A * | 7/1974 | Ryan | ..................... | A47H 13/14 112/134 |
| 5,114,056 A * | 5/1992 | Frye | ......................... | D06J 1/06 223/31 |
| 6,889,622 B2 * | 5/2005 | Marcangelo | ......... | D05B 11/005 112/144 |
| 10,138,583 B2 * | 11/2018 | Harada | .................... | B65H 3/26 |
| 2021/0172105 A1 * | 6/2021 | Baker | ...................... | B65H 7/14 |

FOREIGN PATENT DOCUMENTS

| | | | | |
|---|---|---|---|---|
| JP | 2017169761 A | * | 9/2017 | ............ D05B 21/00 |
| JP | 2022-072371 A | | 5/2022 | |
| KR | 20220112084 A | * | 8/2022 | |

\* cited by examiner

*Primary Examiner* — Shaun R Hurley
(74) *Attorney, Agent, or Firm* — Faegre Drinker Biddle & Reath LLP

(57) ABSTRACT

A creasing apparatus includes a top plate having an upper surface supporting a fabric, a robot manipulator, a folding assembly mounted on the robot manipulator and configured to make a crease on the fabric by pinching the fabric from above, and a control device configured to control the robot manipulator and the folding assembly.

6 Claims, 19 Drawing Sheets

FIG.3
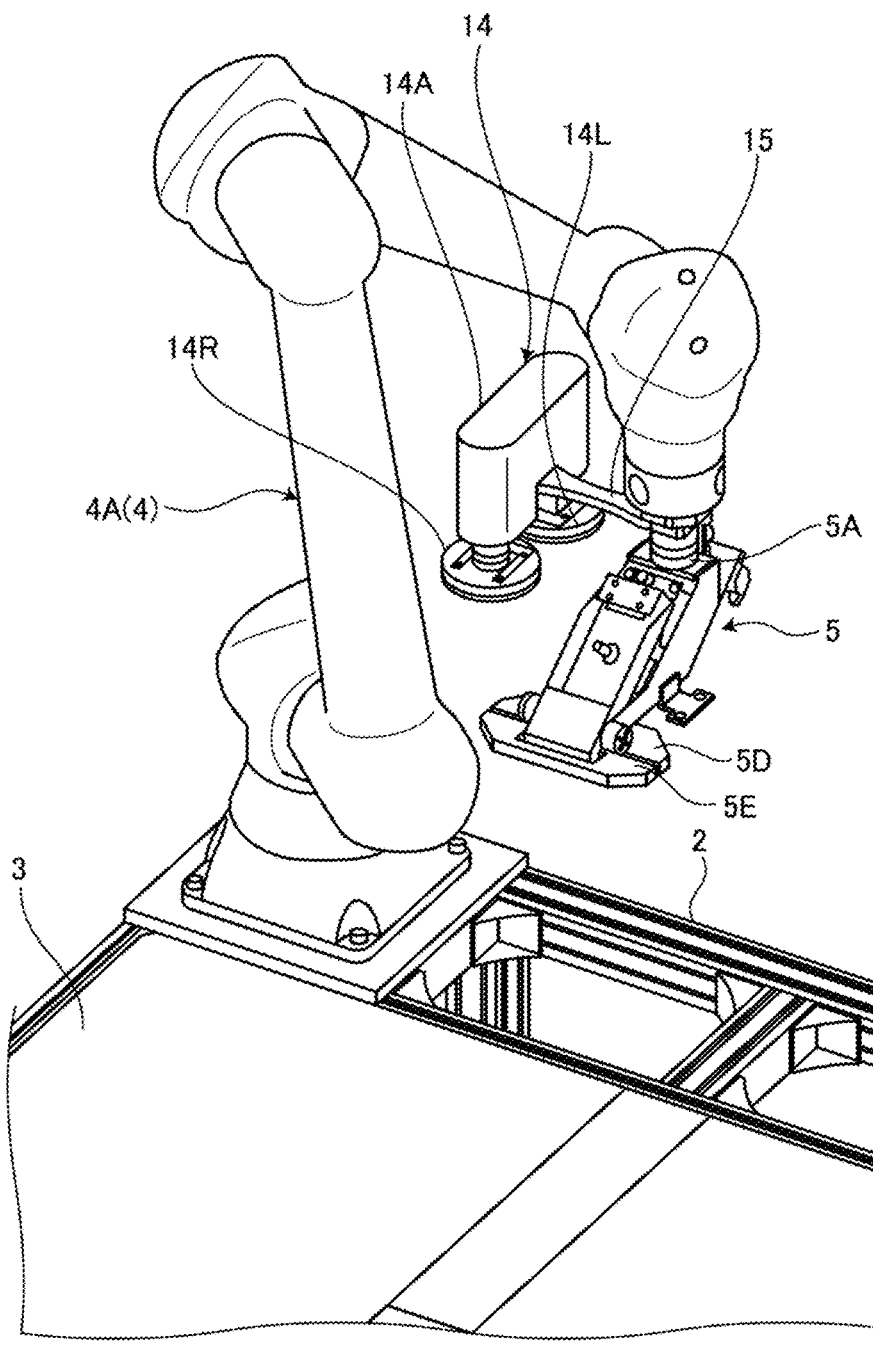
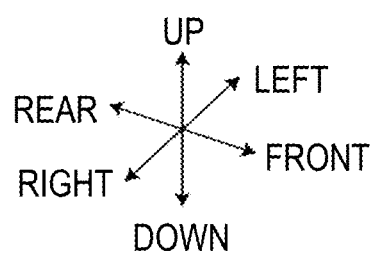

FIG.4
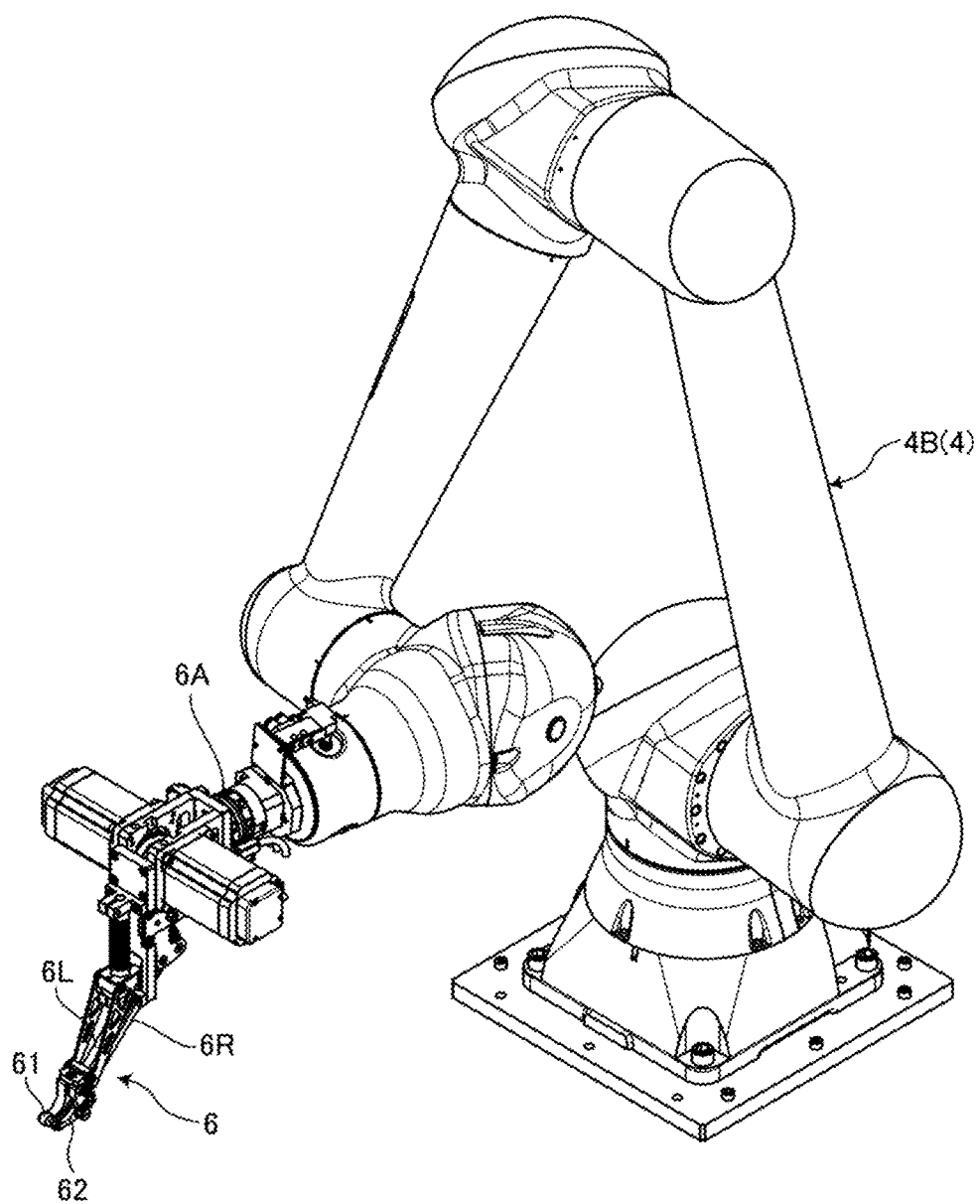
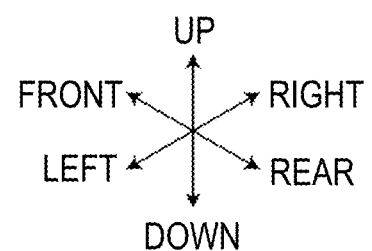

FIG.5
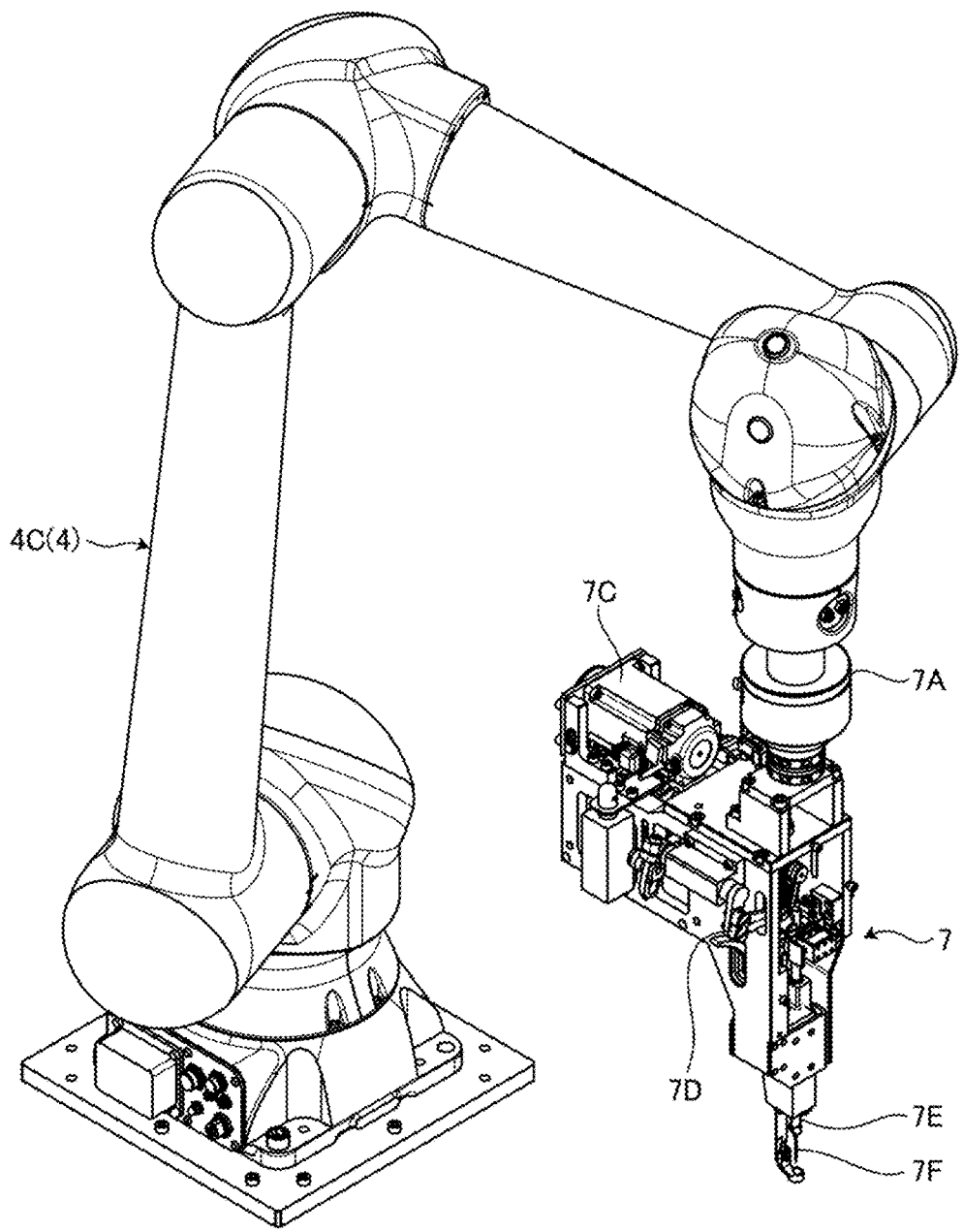
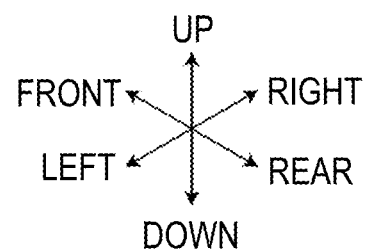

FIG.11 [SCRAPING]

FIG. 15 [FOLDING BACK AND COOLING]

CREASING APPARATUS

CROSS-REFERENCE TO RELATED APPLICATIONS

This application is based on and claims priority under 35 USC 119 from Japanese Patent Application No. 2022-186480 filed on Nov. 22, 2022.

TECHNICAL FIELD

The technology disclosed in the present specification relates to a creasing apparatus.

BACKGROUND ART

As disclosed in JP2022-072371A, when clothing is manufactured, a crease is made on a fabric.

SUMMARY OF INVENTION

In the related art, a crease is made on a fabric by a worker. To efficiently produce clothing, it is desired to automatically make the crease on the fabric.

An aspect of the present invention is a creasing apparatus that includes a top plate having an upper surface supporting a fabric, a robot manipulator, a folding assembly mounted on the robot manipulator and configured to make a crease on the fabric by pinching the fabric from above, and a control device configured to control the robot manipulator and the folding assembly.

According to the creasing apparatus, a crease is automatically made on a fabric.

BRIEF DESCRIPTION OF DRAWINGS

FIG. 3 is a perspective view showing a folding assembly mounted on a tip portion of a first robot manipulator according to the embodiment;

FIG. 4 is a perspective view showing a feeding assembly mounted on a tip portion of a second robot manipulator according to the embodiment;

FIG. 5 is a perspective view showing a sewing machine assembly mounted on a tip portion of a third robot manipulator according to the embodiment;

DESCRIPTION OF EMBODIMENTS

Hereinafter, an embodiment will be described with reference to the drawings. In the embodiment, a positional relationship of each part will be described using terms such as left, right, front, rear, upper, and lower. Such terms indicate a relative position or direction with respect to the center of a sewing apparatus 1.

[Sewing Apparatus]

Figure 1:
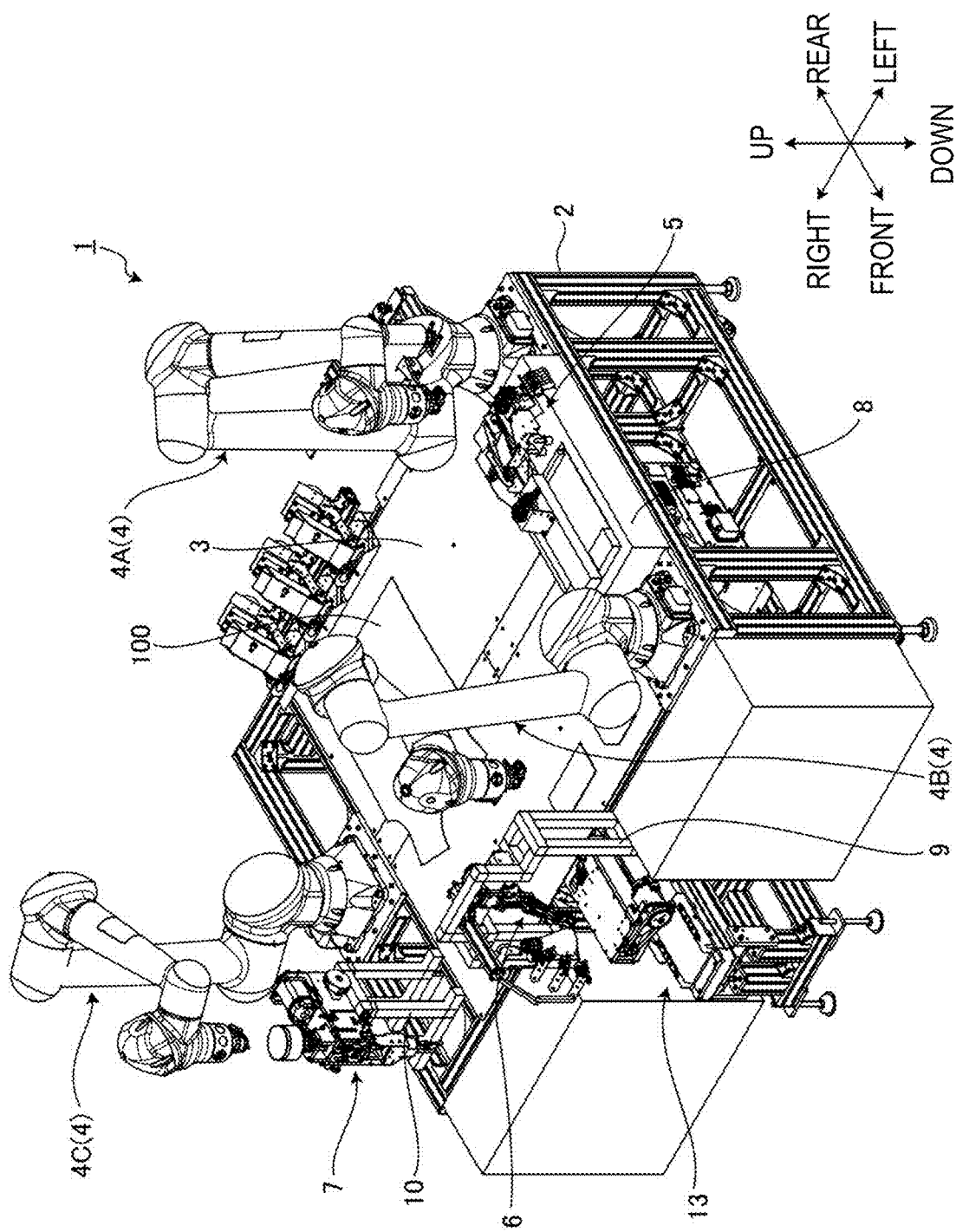
FIG. 1 is a perspective view showing a sewing apparatus according to an embodiment.
Figure 2:
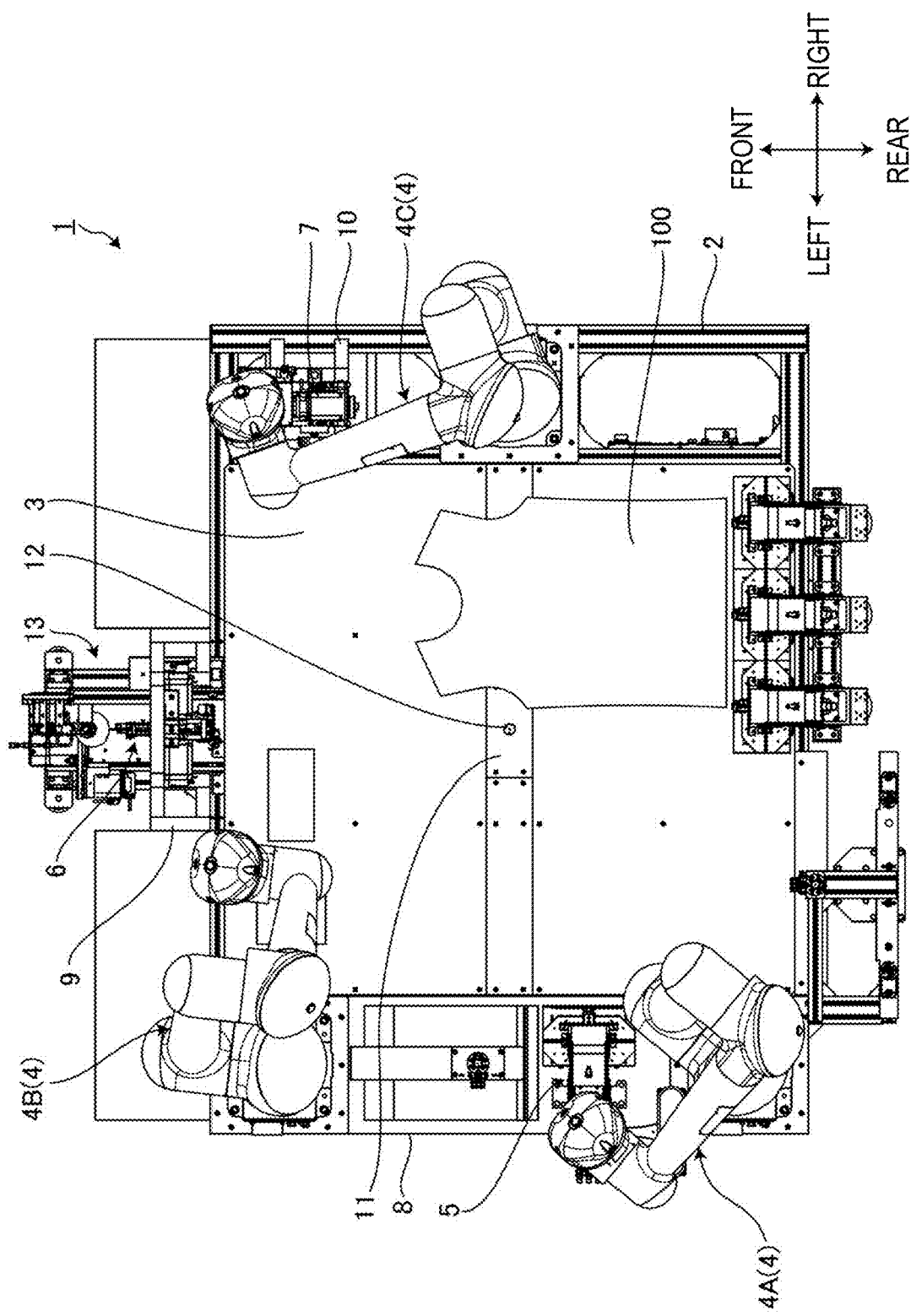
FIG. 2 is a plan view showing the sewing apparatus according to the embodiment.

FIG. 1 is a perspective view showing the sewing apparatus 1 according to the embodiment. FIG. 2 is a plan view showing the sewing apparatus 1 according to the embodiment. As shown in FIGS. 1 and 2, the sewing apparatus 1 includes a pedestal 2, a top plate 3, a robot manipulator 4, a folding assembly 5, a feeding assembly 6, and a sewing machine assembly 7.

The pedestal 2 supports each of the top plate 3 and the robot manipulator 4. The top plate 3 has an upper surface that supports a fabric 100. A base end portion of the robot manipulator 4 is fixed to the pedestal 2 around the top plate 3. Each of the folding assembly 5, the feeding assembly 6, and the sewing machine assembly 7 is attached to and detached from a tip portion of the robot manipulator 4. Each of the folding assembly 5, the feeding assembly 6, and the sewing machine assembly 7 can perform a predetermined operation on the fabric 100 while being mounted on the tip portion of the robot manipulator 4.

The robot manipulator 4 includes an articulated robot. In the embodiment, the robot manipulator 4 is a vertically articulated robot. Note that the robot manipulator 4 may be a horizontally articulated robot. The robot manipulator 4 includes a base member, a rotating member, a first arm, a second arm, a third arm, a rotating actuator, a first rotating actuator, a second rotating actuator, and a third rotating actuator. The base member is fixed to the pedestal 2. The rotating member is rotatably supported by the base member. The rotating member is supported by the base member to be rotatable around a rotating shaft extending in the vertical direction. The first arm is rotatably connected to the rotating member. The first arm is rotatably connected to the rotating member around a first rotating shaft. The first rotating shaft is orthogonal to an axis parallel to the rotating shaft. The second arm is rotatably connected to a tip portion of the first arm. The second arm is rotatably connected to the first arm around a second rotating shaft. The second rotating shaft is parallel to the first rotating shaft. The third arm is rotatably connected to a tip portion of the second arm. The third arm is rotatably connected to the second arm around a third rotating shaft. The third rotating shaft is parallel to the second rotating shaft. Any one of the folding assembly 5, the feeding assembly 6, and the sewing machine assembly 7 is mounted on a tip portion of the third arm. The rotating actuator generates power to rotate the rotating member. The first rotating actuator generates power to rotate the first arm.

The second rotating actuator generates power to rotate the second arm. The third rotating actuator generates power to rotate the third arm.

A plurality of robot manipulators 4 are provided. In the embodiment, three robot manipulators 4 are provided. The robot manipulator 4 includes a first robot manipulator 4A, a second robot manipulator 4B, and a third robot manipulator 4C. The structure of the first robot manipulator 4A, the structure of the second robot manipulator 4B, and the structure of the third robot manipulator 4C are substantially the same.

The folding assembly 5 can be attached to and detached from each of a tip portion of the first robot manipulator 4A, a tip portion of the second robot manipulator 4B, and a tip portion of the third robot manipulator 4C. The feeding assembly 6 can be attached to and detached from each of the tip portion of the first robot manipulator 4A, the tip portion of the second robot manipulator 4B, and the tip portion of the third robot manipulator 4C. The sewing machine assembly 7 can be attached to and detached from each of the tip portion of the first robot manipulator 4A, the tip portion of the second robot manipulator 4B, and the tip portion of the third robot manipulator 4C.

The folding assembly 5 performs a folding operation of making a crease on the fabric 100. The feeding assembly 6 performs a feeding operation of feeding the fabric 100 in a predetermined direction when a seam is made on the fabric 100. The sewing machine assembly 7 performs a sewing operation of making the seam on the fabric 100.

A support base 8, a suspending member 9, and a suspending member 10 are fixed to the pedestal 2 around the upper surface of the top plate 3. The folding assembly 5 is supported by the support base 8 when the folding assembly 5 is not mounted on the robot manipulator 4. The feeding assembly 6 is suspended from the suspending member 9 when the feeding assembly 6 is not mounted on the robot manipulator 4. The sewing machine assembly 7 is suspended from the suspending member 10 when the sewing machine assembly 7 is not mounted on the robot manipulator 4.

The top plate 3 includes a throat plate 11. The throat plate 11 is fixed to the center of the top plate 3. An opening 12 is provided in the throat plate 11. A shuttle is disposed directly below the throat plate 11. A bobbin case is housed in the shuttle. The bobbin case holds a bobbin around which a bobbin thread is wound. The shuttle supplies the bobbin thread. A shuttle guidance mechanism 13 is disposed below the top plate 3. The shuttle is movable between a sewing position directly below the throat plate 11 and a replacement position in front of the pedestal 2 while being guided by the shuttle guidance mechanism 13. The shuttle is movable between the sewing position and the replacement position while being guided by the shuttle guidance mechanism 13 by power generated by a shuttle moving actuator. For example, when the bobbin is replaced, the shuttle is moved to the replacement position.

[Folding Assembly]

FIG. 3 is a perspective view showing the folding assembly 5 mounted on the tip portion of the first robot manipulator 4A according to the embodiment. As shown in FIG. 3, the folding assembly 5 is mounted on the tip portion of the first robot manipulator 4A. The folding assembly 5 has a joint part 5A connected to the tip portion of the first robot manipulator 4A. The folding assembly 5 is mounted on the tip portion of the first robot manipulator 4A with the joint part 5A interposed therebetween. Note that the folding assembly 5 may be mounted on the tip portion of the second robot manipulator 4B or the tip portion of the third robot manipulator 4C.

The folding assembly 5 makes a crease on the fabric 100 by pinching the fabric 100 from above. The folding assembly 5 includes a first hand 5D and a second hand 5E. Here, the fabric 100 is pinched between the first hand 5D and the second hand 5E.

A camera 14 is mounted on the tip portion of the first robot manipulator 4A. The camera 14 is capable of photographing the fabric 100. The camera 14 photographs the fabric 100 supported by the top plate 3 from above. The camera 14 includes a main body part 14A, a first lens 14L, and a second lens 14R. The main body part 14A includes an image sensor that receives light incident through the first lens 14L and the second lens 14R. The image sensor includes a couple charged device (CCD) image sensor or a complementary metal oxide semiconductor (CMOS) image sensor. The main body part 14A is fixed to the tip portion of the first robot manipulator 4A with a connecting member 15 interposed therebetween. Each of the first lens 14L and the second lens 14R is disposed at the lower portion of the main body part 14A. The second lens 14R is disposed next to the first lens 14L. Since the camera 14 includes the first lens 14L and the second lens 14R, a photographing range of the camera 14 becomes large. Note that the camera 14 including the first lens 14L and the second lens 14R may be a stereo camera.

[Feeding Assembly]

FIG. 4 is a perspective view showing the feeding assembly 6 mounted on the tip portion of the second robot manipulator 4B according to the embodiment. As shown in FIG. 4, the feeding assembly 6 is mounted on the tip portion of the second robot manipulator 4B. The feeding assembly 6 has a joint part 6A connected to the tip portion of the second robot manipulator 4B. The feeding assembly 6 is mounted on the tip portion of the second robot manipulator 4B with the joint part 6A interposed therebetween. Note that the feeding assembly 6 may be mounted on the tip portion of the first robot manipulator 4A or the tip portion of the third robot manipulator 4C.

The feeding assembly 6 includes a first presser 61 and a second presser 62 that press the fabric 100 from above, a first belt 6L supported by the first presser 61, and a second belt 6R supported by the second presser 62. Each of the first belt 6L and the second belt 6R is ring-shaped. Each of the first belt 6L and the second belt 6R is an endless belt. A part of the first belt 6L is disposed between the first presser 61 and the fabric 100. A part of the second belt 6R is disposed between the second presser 62 and the fabric 100. Each of the first belt 6L and the second belt 6R is rotated by a feeding motor (not shown). The first presser 61 presses the first belt 6L against the fabric 100. The second presser 62 presses the second belt 6R against the fabric 100. By rotating each of the first belt 6L and second belt 6R pressed against the fabric 100, the fabric 100 is fed in a predetermined direction.

[Sewing Machine Assembly]

FIG. 5 is a perspective view showing the sewing machine assembly 7 mounted on the tip portion of the third robot manipulator 4C according to the embodiment. As shown in FIG. 5, the sewing machine assembly 7 is mounted on the tip portion of the third robot manipulator 4C. The sewing machine assembly 7 has a joint part 7A connected to the tip portion of the third robot manipulator 4C. The sewing machine assembly 7 is mounted on the tip portion of the third robot manipulator 4C with the joint part 7A interposed therebetween. Note that the sewing machine assembly 7 may be mounted on the tip portion of the first robot manipulator 4A or the tip portion of the second robot manipulator 4B.

The sewing machine assembly 7 includes a sewing machine motor 7C, a thread take-up lever 7D, and a needle bar 7E. The needle bar 7E holds a sewing machine needle 7F. The sewing machine motor 7C generates power to enable the needle bar 7E to reciprocate in the vertical direction. The thread take-up lever 7D supplies a needle thread to the sewing machine needle 7F. The power generated by the sewing machine motor 7C is transmitted to each of the needle bar 7E and the thread take-up lever 7D via a power transmission mechanism. The needle bar 7E, the thread take-up lever 7D, and the shuttle are interlocked. As the power generated by the sewing machine motor 7C is transmitted to the needle bar 7E, the needle bar 7E and the sewing machine needle 7F held by the needle bar 7E reciprocate in the vertical direction. The power generated by the sewing machine motor 7C is transmitted to the thread take-up lever 7D, so that the thread take-up lever 7D reciprocates in the vertical direction in conjunction with the needle bar 7E. The shuttle is rotated in conjunction with the needle bar 7E and the thread take-up lever 7D. The sewing machine needle 7F can pass through the opening 12 of the throat plate 11. The shuttle is disposed directly below the throat plate 11. By supplying a bobbin thread, the shuttle cooperates with the sewing machine needle 7F to form a seam on the fabric 100. When the seam is formed on the fabric 100, the sewing machine assembly 7 is disposed directly above the throat plate 11 to allow the sewing machine needle 7F to pass through the opening 12 in the throat plate 11. When the seam is formed on the fabric 100, the third robot manipulator 4C disposes the sewing machine assembly 7 directly above the throat plate 11. When the seam is formed on the fabric 100, the feeding assembly 6 is disposed near the sewing machine assembly 7. When the seam is formed on the fabric 100, the second robot manipulator 4B disposes the feeding assembly 6 near the sewing machine assembly 7. While the fabric 100 is fed in a predetermined direction by the feeding assembly 6, the needle bar 7E of the sewing machine assembly 7 reciprocates in the vertical direction. The sewing machine assembly 7 forms the seam on the fabric 100 in cooperation with the sewing machine needle 7F held by the needle bar 7E and the shuttle.

Note that, as described with reference to FIG. 3, the camera 14 is mounted on the tip portion of the first robot manipulator 4A having the folding assembly 5 mounted thereon. The camera 14 may be mounted on the tip portion of the second robot manipulator 4B having the feeding assembly 6 mounted thereon. The camera 14 may be mounted on the tip portion of the third robot manipulator 4C having the sewing machine assembly 7 mounted thereon.

[Control Device]

Figure 6:
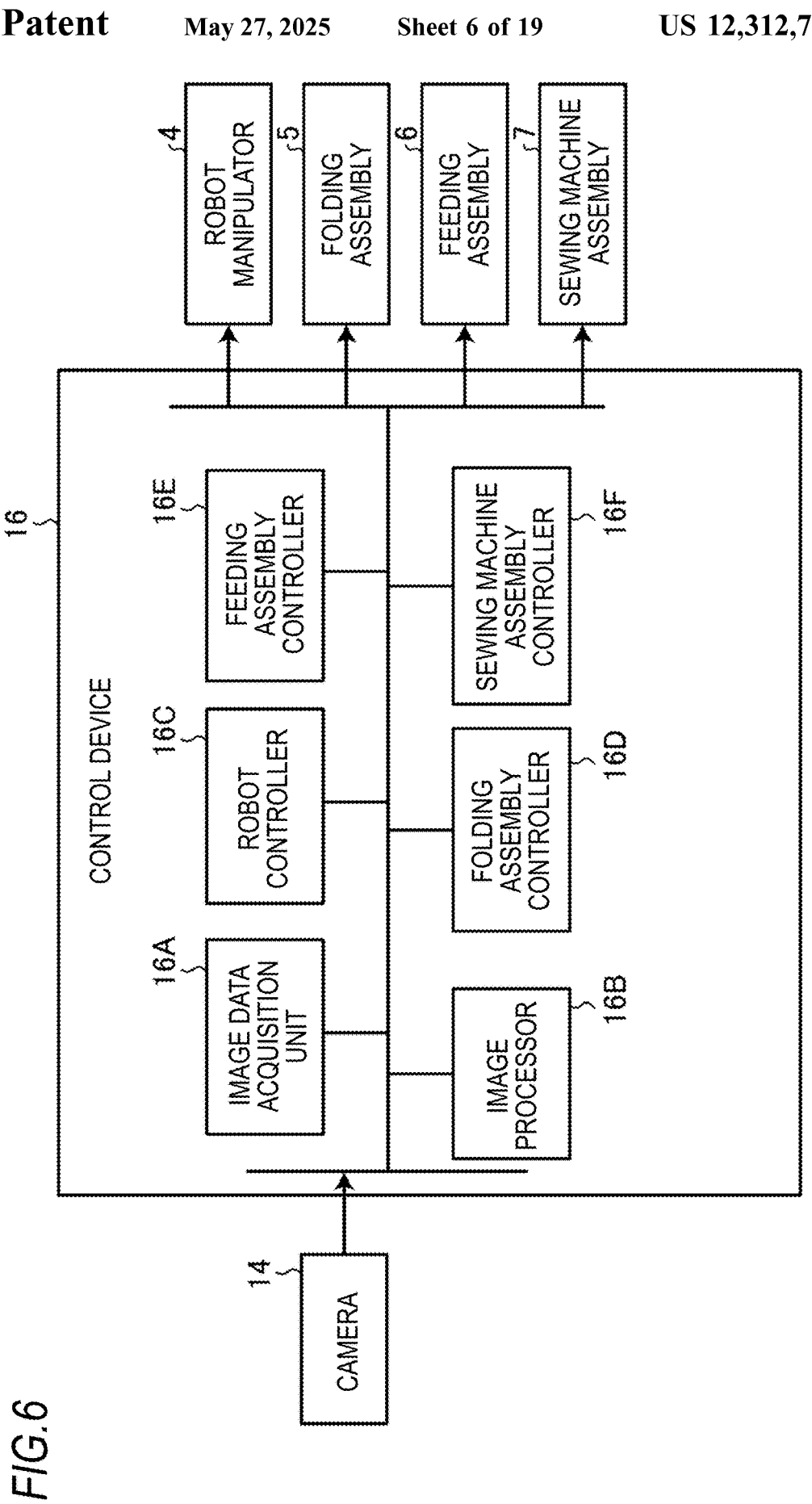
FIG. 6 is a block diagram showing a control device of the sewing apparatus according to the embodiment.

FIG. 6 is a block diagram showing a control device 16 of the sewing apparatus 1 according to the embodiment. The control device 16 controls the robot manipulator 4, the folding assembly 5 mounted on the robot manipulator 4, the feeding assembly 6 mounted on the robot manipulator 4, and the sewing machine assembly 7 mounted on the robot manipulator 4. The control device 16 includes a computer system. The control device 16 includes a processor such as a central processing unit (CPU), a memory such as a read only memory (ROM) or a random access memory (RAM), and an input/output interface including an input/output circuit capable of inputting/outputting signals and data.

The control device 16 includes an image data acquisition unit 16A, an image processor 16B, a robot controller 16C, a folding assembly controller 16D, a feeding assembly controller 16E, and a sewing machine assembly controller 16F.

The image data acquisition unit 16A acquires image data of the fabric 100 photographed by the camera 14. The image processor 16B calculates the position of the fabric 100 based on the image data of the fabric 100 acquired by the image data acquisition unit 16A. In the embodiment, the image processor 16B calculates a target portion of the fabric 100 on which the crease is to be made based on the image data of the fabric 100 acquired by the camera 14. The image processor 16B may calculate the position of the target portion of the fabric 100 based on the image data of the end portion of the fabric 100. When the fabric 100 is provided with an alignment mark, the image processor 16B may calculate the position of the target portion of the fabric 100 based on the image data of the mark. When the fabric 100 is provided with a pattern (a shape), the image processor 16B may calculate the position of the target portion of the fabric 100 based on the image data of the pattern.

The robot controller 16C controls the robot manipulator 4. When the crease is made on the fabric 100, the robot controller 16C controls the first robot manipulator 4A to allow the target portion of the fabric 100 on which the crease is to be made calculated by the image processor 16B and the folding assembly 5 to face each other.

When the folding assembly 5 is mounted on the tip portion of the robot manipulator 4, the robot controller 16C controls the robot manipulator 4 to allow the tip portion of the robot manipulator 4 to approach the folding assembly 5 supported by the support base 8. The folding assembly 5 is mounted on the robot manipulator 4 by connecting the joint part 5A of the folding assembly 5 supported by the support base 8 to the tip portion of the robot manipulator 4. When the folding assembly 5 is detached from the tip portion of the robot manipulator 4, the robot controller 16C controls the robot manipulator 4 to allow the folding assembly 5 mounted on the tip portion of the robot manipulator 4 to approach the support base 8. After the folding assembly 5 is supported by the support base 8, the connection between the tip portion of the robot manipulator 4 and the joint part 5A of the folding assembly 5 is released.

When the feeding assembly 6 is mounted on the tip portion of the robot manipulator 4, the robot controller 16C controls the robot manipulator 4 to allow the tip portion of the robot manipulator 4 to approach the feeding assembly 6 suspended from the suspending member 9. The feeding assembly 6 is mounted on the robot manipulator 4 by connecting the joint part 6A of the feeding assembly 6 suspended from the suspending member 9 to the tip portion of the robot manipulator 4. When the feeding assembly 6 is detached from the tip portion of the robot manipulator 4, the robot controller 16C controls the robot manipulator 4 to allow the feeding assembly 6 mounted on the tip portion of the robot manipulator 4 to approach the suspending member 9. After the feeding assembly 6 is suspended from the suspending member 9, the connection between the tip portion of the robot manipulator 4 and the joint part 6A of the feeding assembly 6 is released.

When the sewing machine assembly 7 is mounted on the tip portion of the robot manipulator 4, the robot controller 16C controls the robot manipulator 4 to allow the tip portion of the robot manipulator 4 to approach the sewing machine assembly 7 suspended from the suspending member 10. The sewing machine assembly 7 is mounted on the robot manipulator 4 by connecting the joint part 7A of the sewing machine assembly 7 suspended from the suspending member 10 to the tip portion of the robot manipulator 4. When the sewing machine assembly 7 is detached from the tip portion of the robot manipulator 4, the robot controller 16C controls the robot manipulator 4 to allow the sewing machine assembly 7 mounted on the tip portion of the robot manipulator 4 to approach the suspending member 10. After the sewing machine assembly 7 is suspended from the suspending member 10, the connection between the tip portion of the robot manipulator 4 and the joint part 7A of the sewing machine assembly 7 is released.

The folding assembly controller 16D controls the folding assembly 5. The folding assembly controller 16D controls the folding assembly 5 to allow the folding assembly 5 to pinch the target portion of the fabric 100 after the target portion of the fabric 100 and the folding assembly 5 face each other.

The feeding assembly controller 16E controls the feeding assembly 6. The sewing machine assembly controller 16F controls the sewing machine assembly 7.

In the embodiment, the creasing apparatus configured to make a crease on the fabric 100 is configured by the top plate 3 supporting the fabric 100, the first robot manipulator 4A, the folding assembly 5 mounted on the first robot manipulator 4A, and the control device 16.

[Folding Assembly]

Figure 7:
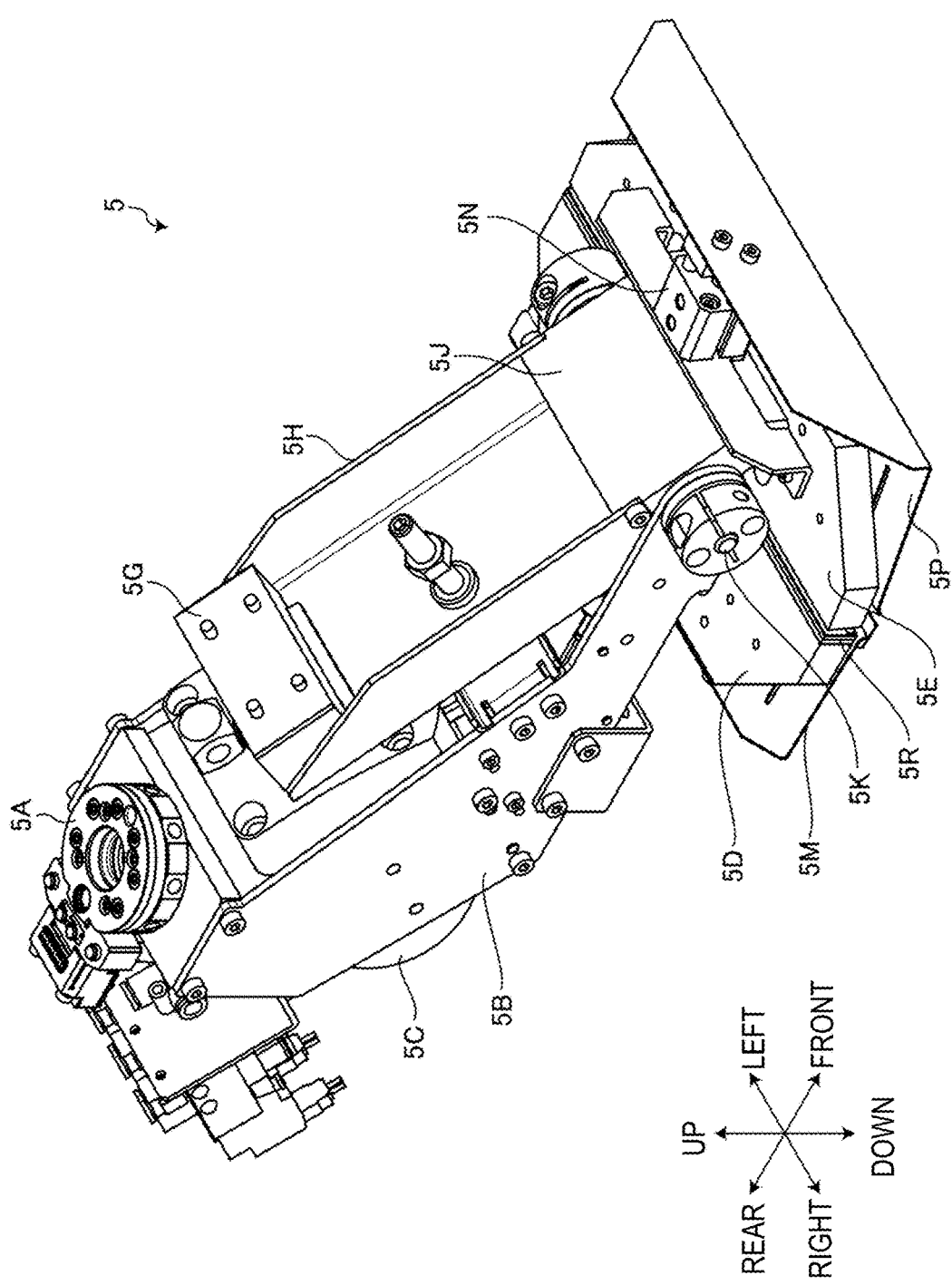
FIG. 7 is a perspective view showing the folding assembly according to the embodiment.
Figure 8:
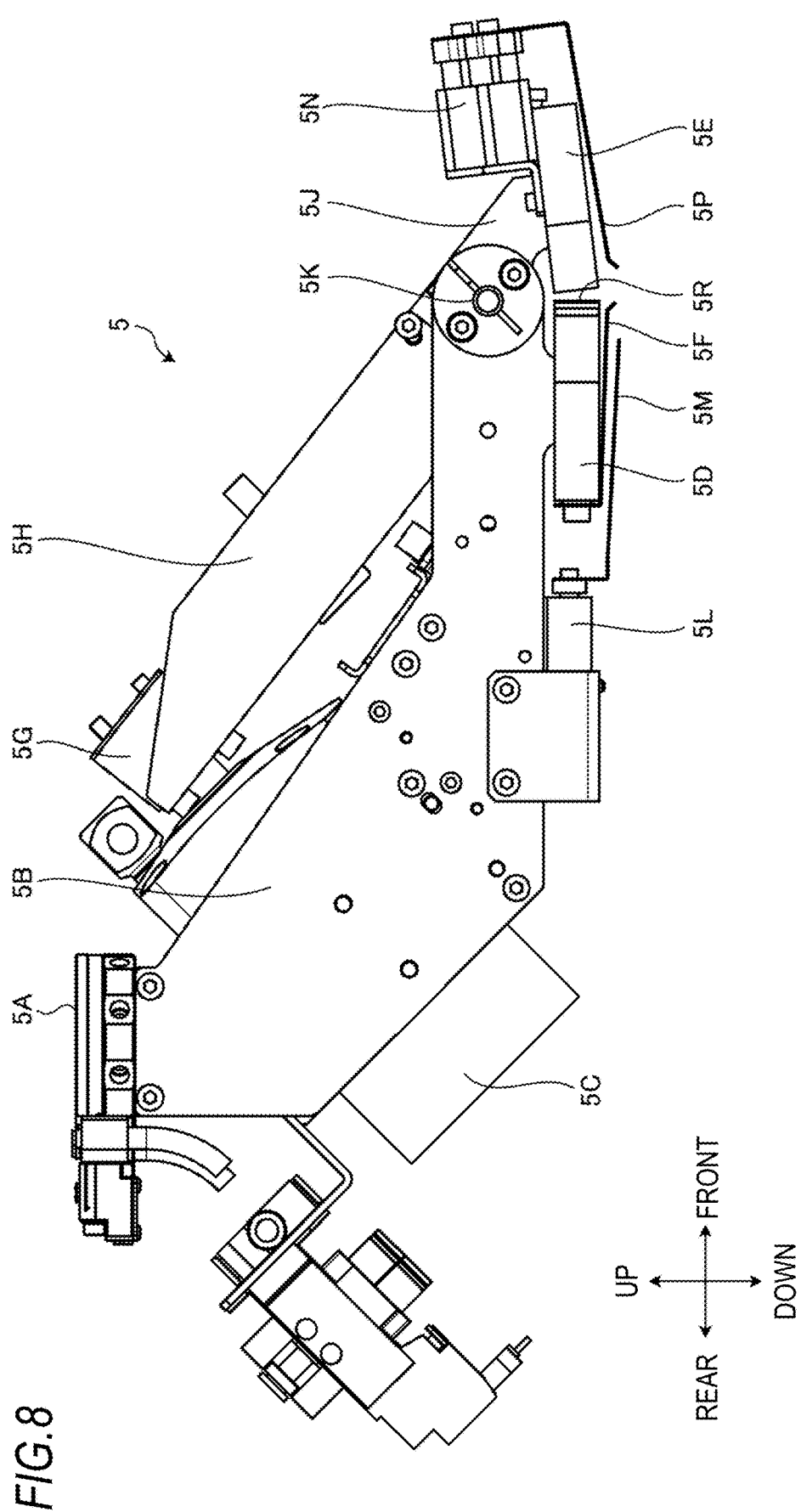
FIG. 8 is a side view showing the folding assembly according to the embodiment.

FIG. 7 is a perspective view showing the folding assembly 5 according to the embodiment. FIG. 8 is a side view showing the folding assembly 5 according to the embodiment. As shown in FIGS. 7 and 8, the folding assembly 5 includes the joint part 5A, a base member 5B, a pressurizing cylinder 5C, a first hand 5D, a second hand 5E, a mountain folding member 5F, a fixing member 5G, a connecting member 5H, a fixing member 5J, a hinge mechanism 5K, a folding-back cylinder 5L, a folding-back member 5M, a scraping cylinder 5N, a scraping member 5P, and a pressing member 5R.

The joint part 5A is connected to the tip portion of the first robot manipulator 4A. The base member 5B supports the joint part 5A.

The pressurizing cylinder 5C is, for example, an air cylinder. A cylinder part of the pressurizing cylinder 5C is fixed to the base member 5B. A rod part of the pressurizing cylinder 5C is fixed to the fixing member 5G.

The first hand 5D is fixed to a lower end portion of the base member 5B. The first hand 5D includes the pressing member 5R. The second hand 5E is disposed in front of the first hand 5D. The second hand 5E is disposed to face the pressing member 5R of the first hand 5D. The second hand 5E is fixed to the fixing member 5J.

A rear end portion of the mountain folding member 5F is fixed to the rear surface of the first hand 5D with a screw. A part of the mountain folding member 5F is disposed below the first hand 5D. The mountain fold member 5F is a thin metal plate. The mountain folding member 5F can be elastically deformed. The mountain folding member 5F may be formed in a comb-teeth shape. A front end portion of the mountain folding member 5F is bent downwards.

The fixing member 5G and the fixing member 5J are connected to each other via the connecting member 5H. The fixing member 5G, the connecting member 5H, and the fixing member 5J are fixed. The fixing member 5G, the connecting member 5H, and the fixing member 5J may be considered to be integrated with each other (a single member). A front end portion of the base member 5B and the fixing member 5J are connected to each other via the hinge mechanism 5K. A rotation shaft of the hinge mechanism 5K extends in the left-and-right direction.

When the pressurizing cylinder 5C extends, the fixing member 5G, the connecting member 5H, and the fixing member 5J rotate around the hinge mechanism 5K to allow the fixing member 5G to move upwards and forwards and to allow the fixing member 5J to move downwards and rearwards. The second hand 5E is fixed to the fixing member 5J. The fixing member 5G, the connecting member 5H, and the fixing member 5J rotate around the hinge mechanism 5K to allow the fixing member 5J to move downwards and rearwards, and accordingly, the second hand 5E moves rearwards to approach the first hand 5D.

When the pressurizing cylinder 5C contracts, the fixing member 5G, the connecting member 5H, and the fixing member 5J rotate around the hinge mechanism 5K to allow the fixing member 5G to move downwards and rearwards and to allow the fixing member 5J to move upwards and forwards. The second hand 5E is fixed to the fixing member 5J. The fixing member 5G, the connecting member 5H, and the fixing member 5J rotate around the hinge mechanism 5K to allow the fixing member 5J to move upwards and forwards and, as such, the second hand 5E moves forwards to be separated from the first hand 5D.

The second hand 5E moves to approach the first hand 5D while the fabric 100 is disposed between the first hand 5D and the second hand 5E, thereby allowing the fabric 100 to be pinched between the first hand 5D and the second hand 5E.

The second hand 5E moves to be separated from the first hand 5D, thereby allowing the fabric 100 being pinched between the first hand 5D and the second hand 5E to be released from the first hand 5D and the second hand 5E. That is, the second hand 5E moves to be separated from the first hand 5D, thereby making it possible to release pinching of the fabric 100 between the first hand 5D and the second hand 5E.

The folding-back cylinder 5L is, for example, an air cylinder. A cylinder part of the folding-back cylinder 5L is fixed to a lower portion of the base member 5B. A rod part of the folding-back cylinder 5L is fixed to a rear end portion of the folding-back member 5M.

The folding-back member 5M folds back a rear end portion of the fabric 100 pinched between the first hand 5D and the second hand 5E in the forward direction. The folding-back member 5M is disposed in front of the folding-back cylinder 5L. A part of the folding-back member 5M is disposed below the mountain folding member 5F.

When the folding-back cylinder 5L extends, the folding-back member 5M moves forwards. When the folding-back member 5L contracts, the folding-back member 5M moves rearwards. The folding-back member 5M is a thin metal plate. The folding-back member 5M can be elastically deformed. A front end portion of the folding-back member 5M is bent downwards.

The scraping cylinder 5N is, for example, an air cylinder. A cylinder part of the scraping cylinder 5N is fixed to the upper surface of the second hand 5E via a bracket. The cylinder part of the scraping cylinder 5N may be fixed to, for example, the fixing member 5J. A part of the scraping member 5P is disposed in front of the scraping cylinder 5N. A rod part of the scraping cylinder 5N is fixed to a front end portion of the scraping member 5P.

A part of the scraping member 5P is disposed below the second hand 5E. The scraping member 5P is disposed in front of the mountain folding member 5F and the folding-back member 5M. The scraping member 5P is movable to approach the mountain folding member 5F or to be separated therefrom.

When the scraping cylinder 5N extends, the scraping member 5P moves forwards. When the scraping cylinder 5N contracts, the scraping member 5P moves rearwards. The scraping member 5P is a thin metal plate. The scraping member 5P can be elastically deformed. A rear end portion of the scraping member 5P is bent downwards.

The pressing member 5R is disposed at a front portion of the first hand 5D. The pressing member 5R faces the rear surface of the second hand 5E. Each of the first hand 5D and the second hand 5E may be made of metal. The pressing member 5R is more flexible than the first hand 5D. The pressing member 5R may be made of, for example, urethane resin or silicone resin.

[Creasing of Fabric]

Each of FIGS. 9 to 19 is a diagram showing the operation of the folding assembly 5 according to the embodiment. Similarly to FIG. 8, in FIGS. 9 to 19, the right side of the paper surface is defined as the front of the folding assembly 5, and the left side of the paper surface is defined as the rear of the folding assembly 5.

Figure 9:
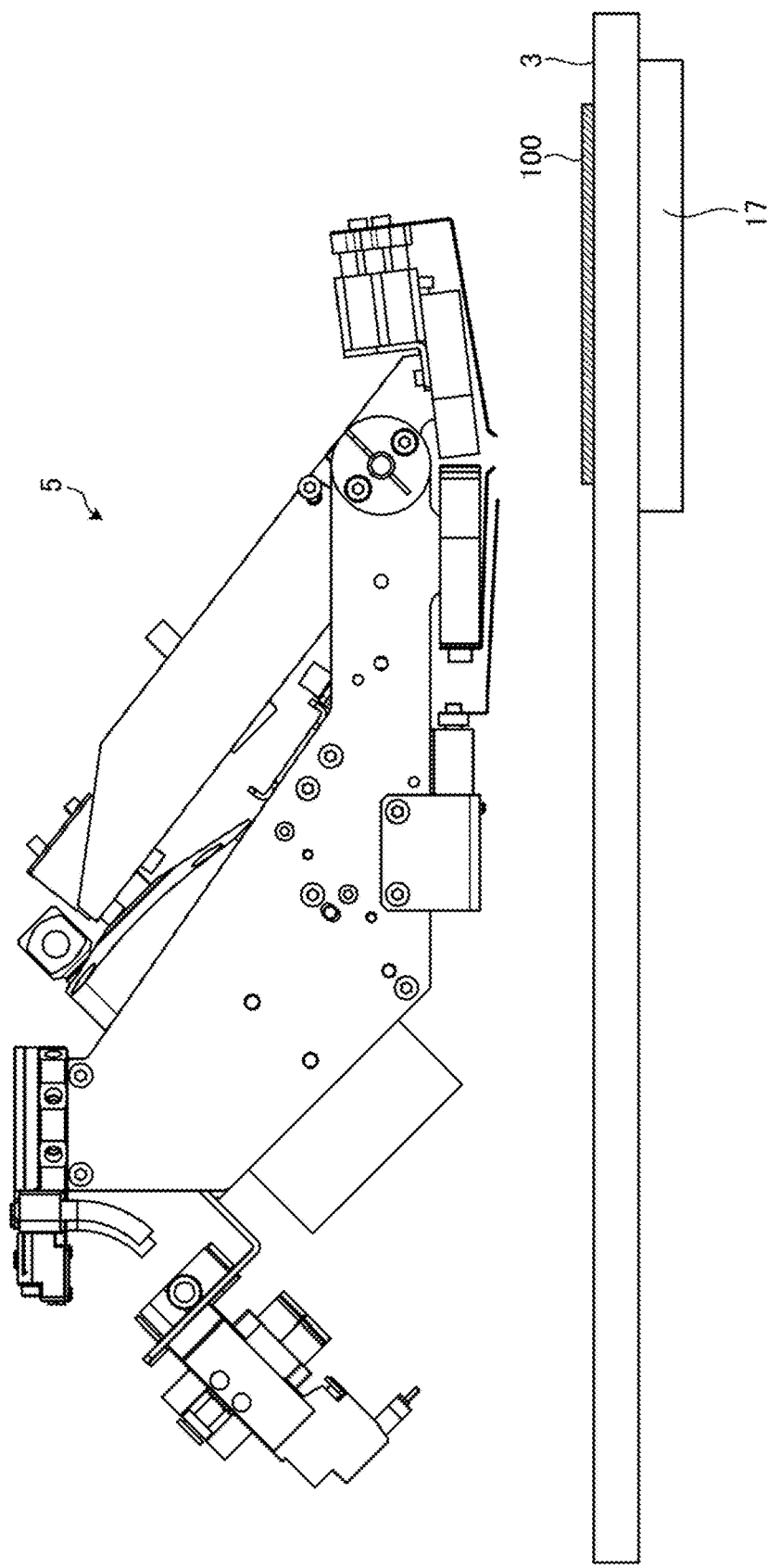
FIG. 9 is a diagram showing an operation of the folding assembly according to the embodiment.

As shown in FIG. 9, the fabric 100 may be heated before a crease is made on the fabric 100. In the embodiment, the sewing apparatus 1 includes a heating device 17 that heats the top plate 3. The heating device 17 is disposed to contact at least a part of the lower surface of the top plate 3. The heating device 17 heats the top plate 3 from below. The fabric 100 disposed on the upper surface of the top plate 3 is heated by the heating device 17 with the top plate 3 interposed therebetween. Accordingly, it is possible to strongly make a crease on the fabric 100.

The fabric 100 is photographed by the camera 14. The image processor 16B calculates the position of the fabric 100 based on image data of the fabric 100 acquired by the camera 14. The image processor 16B calculates a position of a target portion of the fabric 100 on which the crease is to be made based on the image data of the fabric 100. The image processor 16B may calculate the position of the target portion of the fabric 100 based on the image data of an end portion of the fabric 100. When the fabric 100 is provided with an alignment mark, the image processor 16B may calculate the position of the target portion of the fabric 100 based on the image data of the mark. When the fabric 100 has a pattern (a shape), the image processor 16B may calculate the position of the target portion of the fabric 100 based on the image data of the pattern (the shape).

After the position of the target portion of the fabric 100 is calculated by the image processor 16B, the robot controller 16C adjusts the position of the folding assembly 5 with respect to the fabric 100. In the embodiment, the robot controller 16C controls the first robot manipulator 4A to allow the target portion of the fabric 100 and the folding assembly 5 to face each other. In the embodiment, the robot controller 16C adjusts the position of the folding assembly 5 with respect to the fabric 100 to dispose the target portion of the fabric 100 between the mountain folding member 5F and the scraping member 5P.

Figure 10:
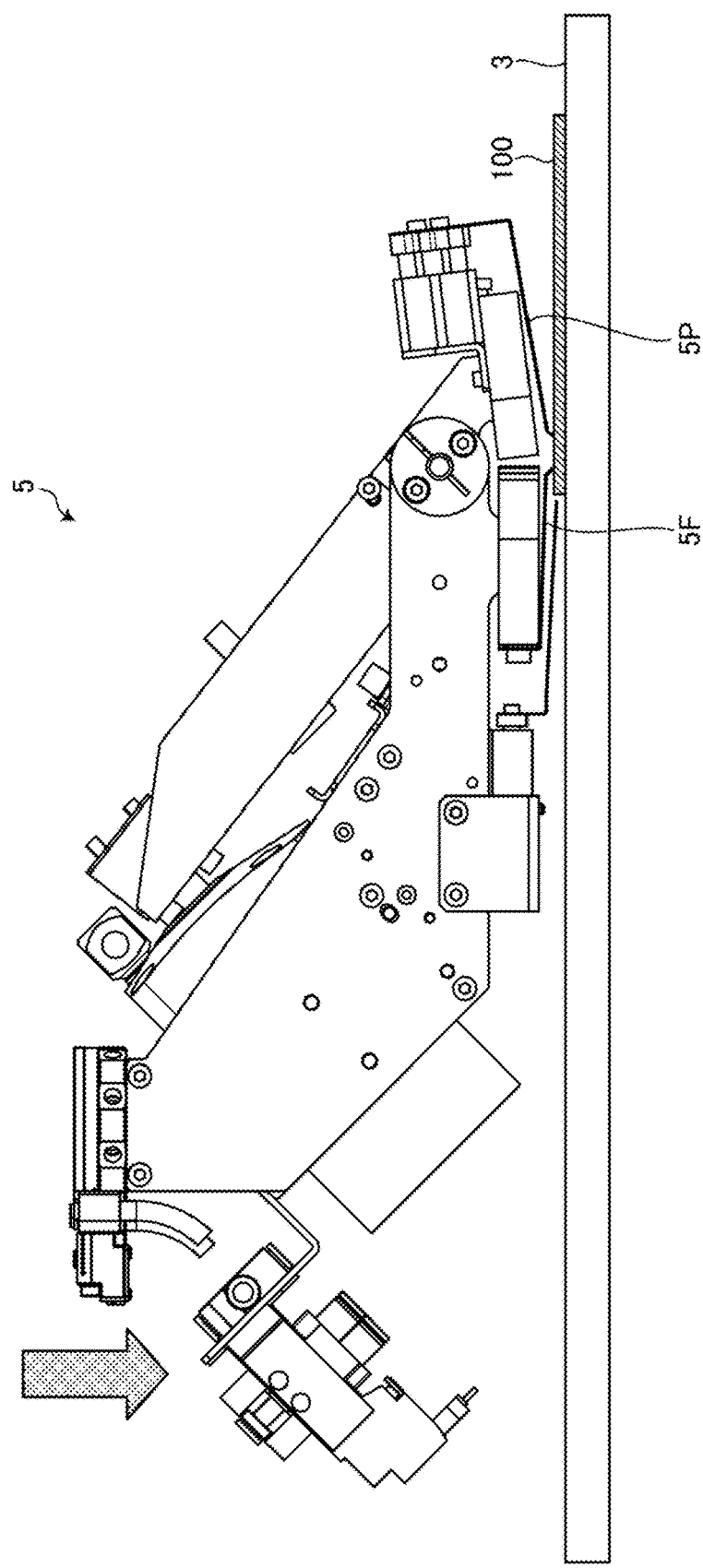
FIG. 10 is a diagram showing the operation of the folding assembly according to the embodiment.

After the position of the folding assembly 5 with respect to the fabric 100 is adjusted, as shown in FIG. 10, the robot controller 16C controls the first robot manipulator 4A to move the folding assembly 5 downwards. The robot controller 16C lowers the folding assembly 5 to allow a front end portion of the mountain folding member 5F and a rear end portion of the scraping member 5P to contact the fabric 100.

Figure 11:
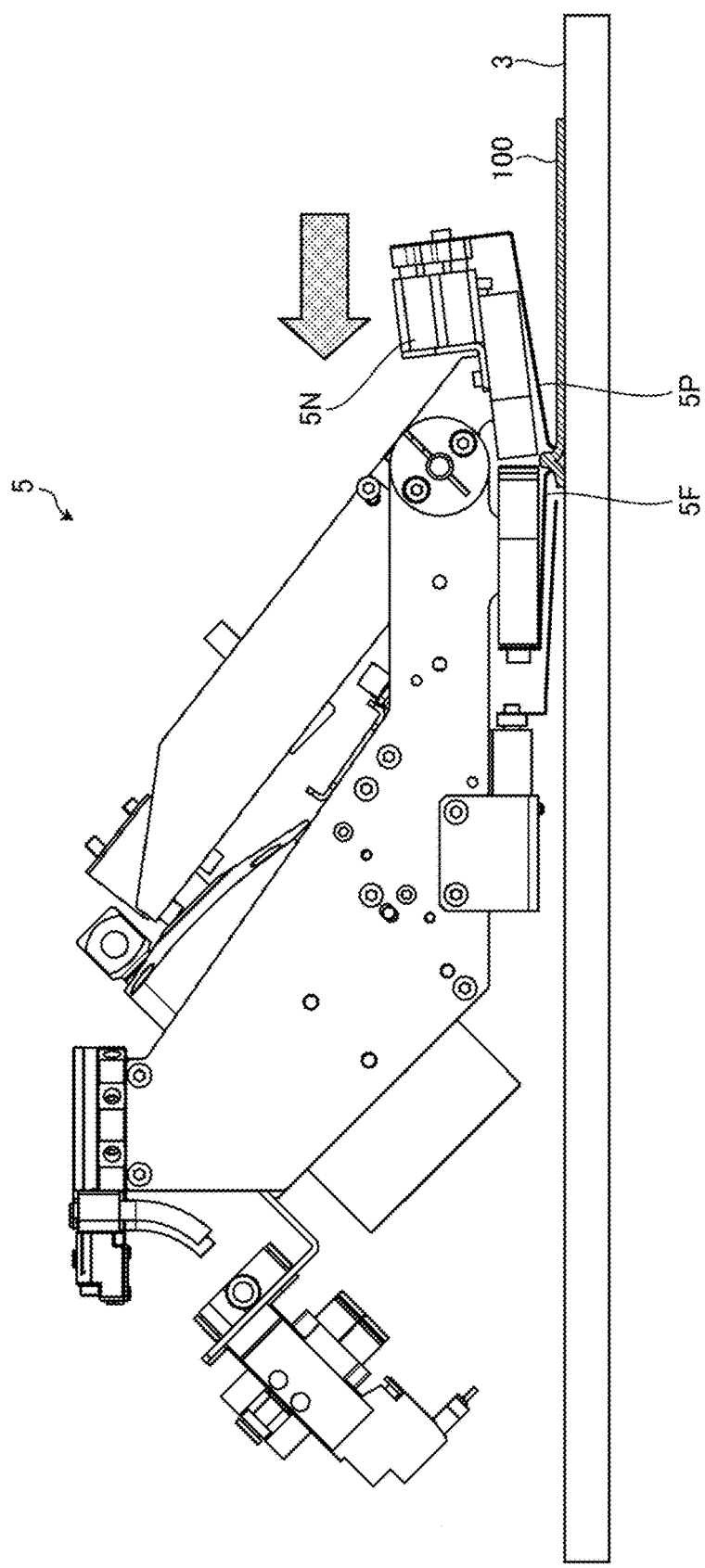
FIG. 11 is a diagram showing the operation of the folding assembly according to the embodiment.

After the front end portion of the mountain folding member 5F and the rear end portion of the scraping member 5P contact the fabric 100, as shown in FIG. 11, the folding assembly controller 16D controls the scraping cylinder 5N to move the scraping member 5P rearwards. By moving the scraping member 5P rearwards, the fabric 100 is scraped into the scraping member 5P and is pinched between the mountain folding member 5F and the scraping member 5P. As a result, the fabric 100 is mountain-folded between the mountain folding member 5F and the scraping member 5P. A mountain-folded portion of the fabric 100 is disposed between the first hand 5D and the second hand 5E.

Figure 12:
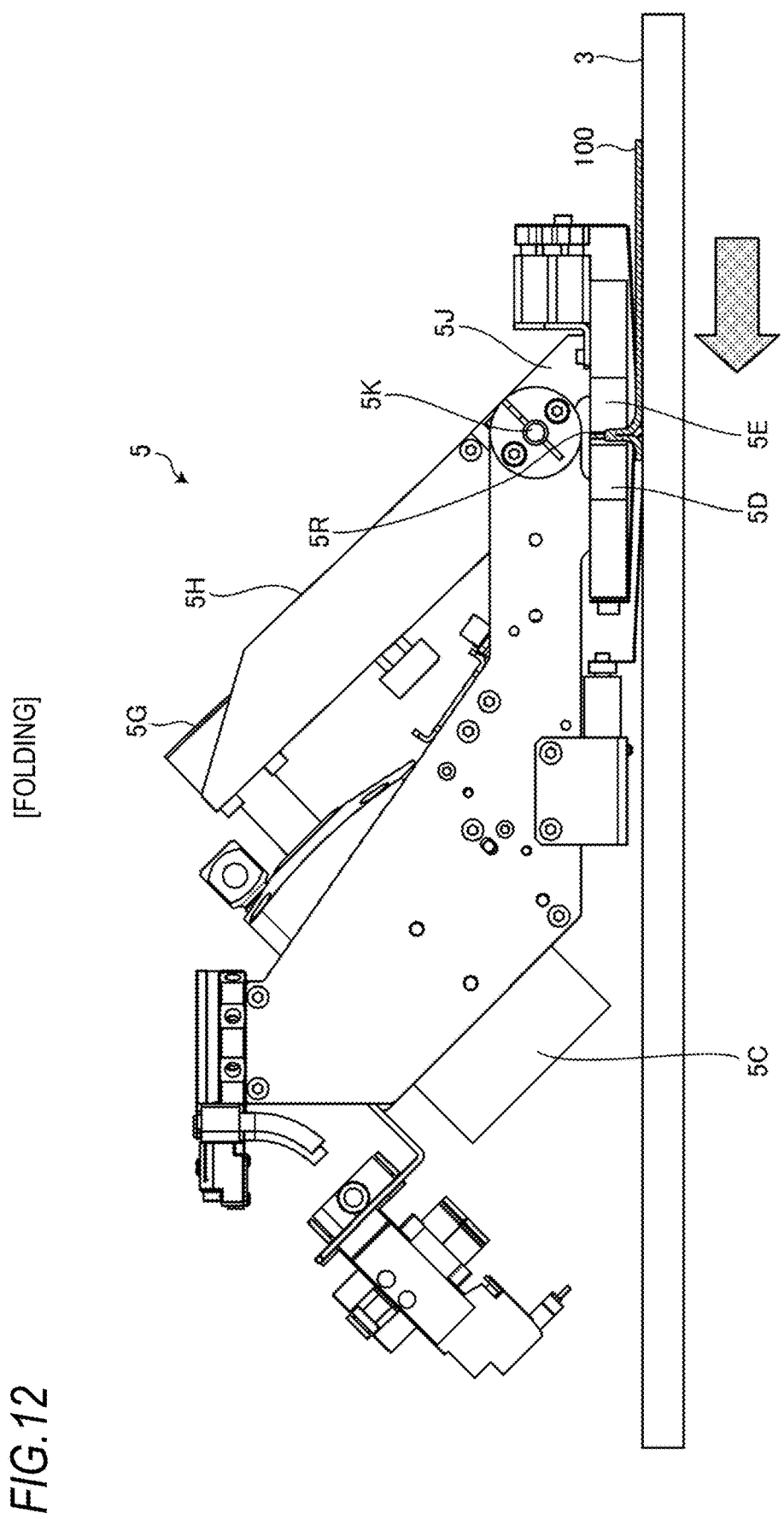
FIG. 12 is a diagram showing the operation of the folding assembly according to the embodiment.

After the mountain-folded portion of the fabric 100 is disposed between the first hand 5D and the second hand 5E, as shown in FIG. 12, the folding assembly controller 16D controls the pressurizing cylinder 5C to move the second hand 5E rearwards. As the second hand 5E moves rearwards, the fabric 100 is pinched between the first hand 5D and the second hand 5E. The first hand 5D and the second hand 5E pinch the portion of the fabric 100 mountain-folded by the mountain folding member 5F and the scraping member 5P. The fabric 100 heated by the heating device 17 is strongly pinched between the first hand 5D and the second hand 5E, thereby firmly making the crease on the fabric 100.

Figure 13:
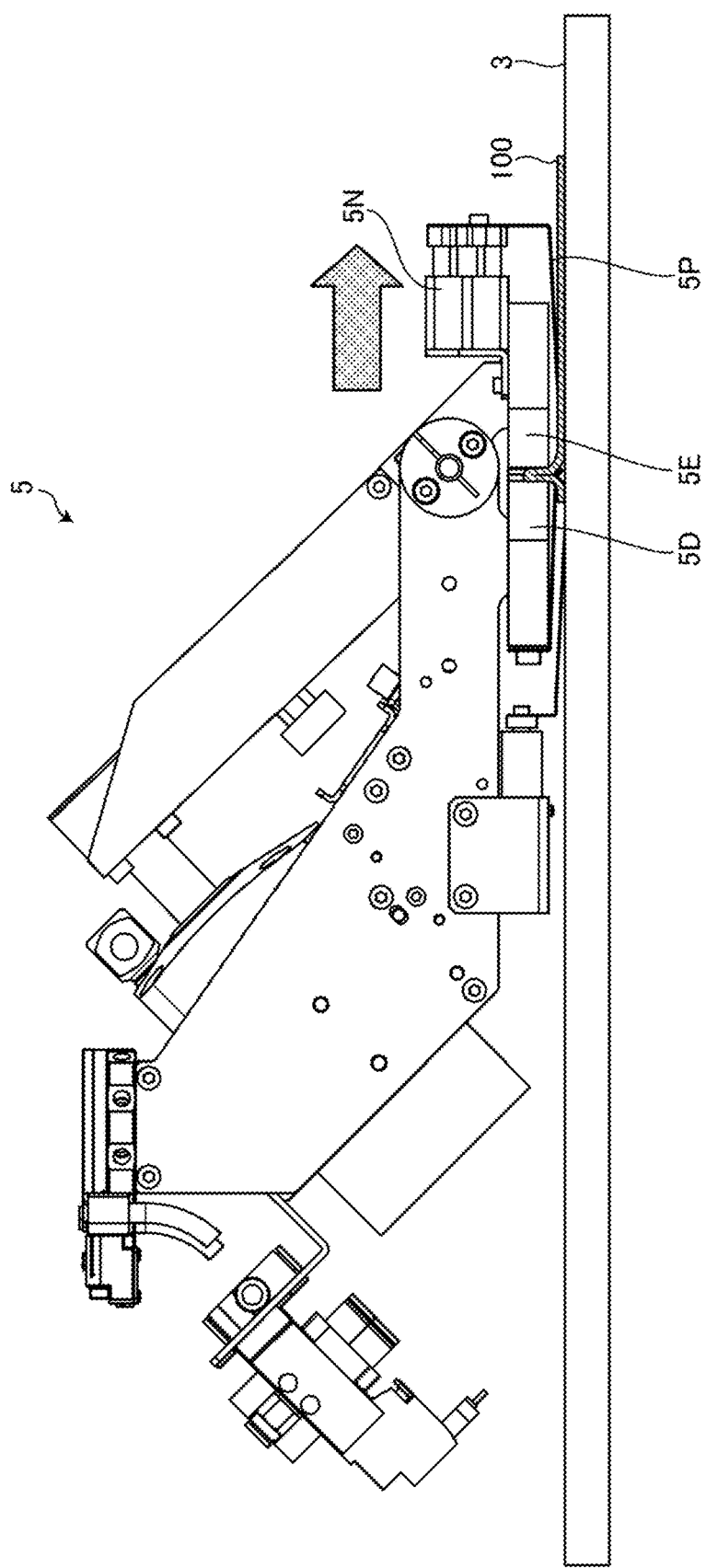
FIG. 13 is a diagram showing the operation of the folding assembly according to the embodiment.

After the mountain-folded portion of the fabric 100 is pinched between the first hand 5D and the second hand 5E and the crease is made on the fabric 100, as shown in FIG. 13, the folding assembly controller 16D controls the scraping cylinder 5N to move the scraping member 5P forwards while the fabric 100 is pinched between the first hand 5D and the second hand 5E. By moving the scraping member 5P forwards, scraping of the fabric 100 by the scraping member 5P is released.

Figure 14:
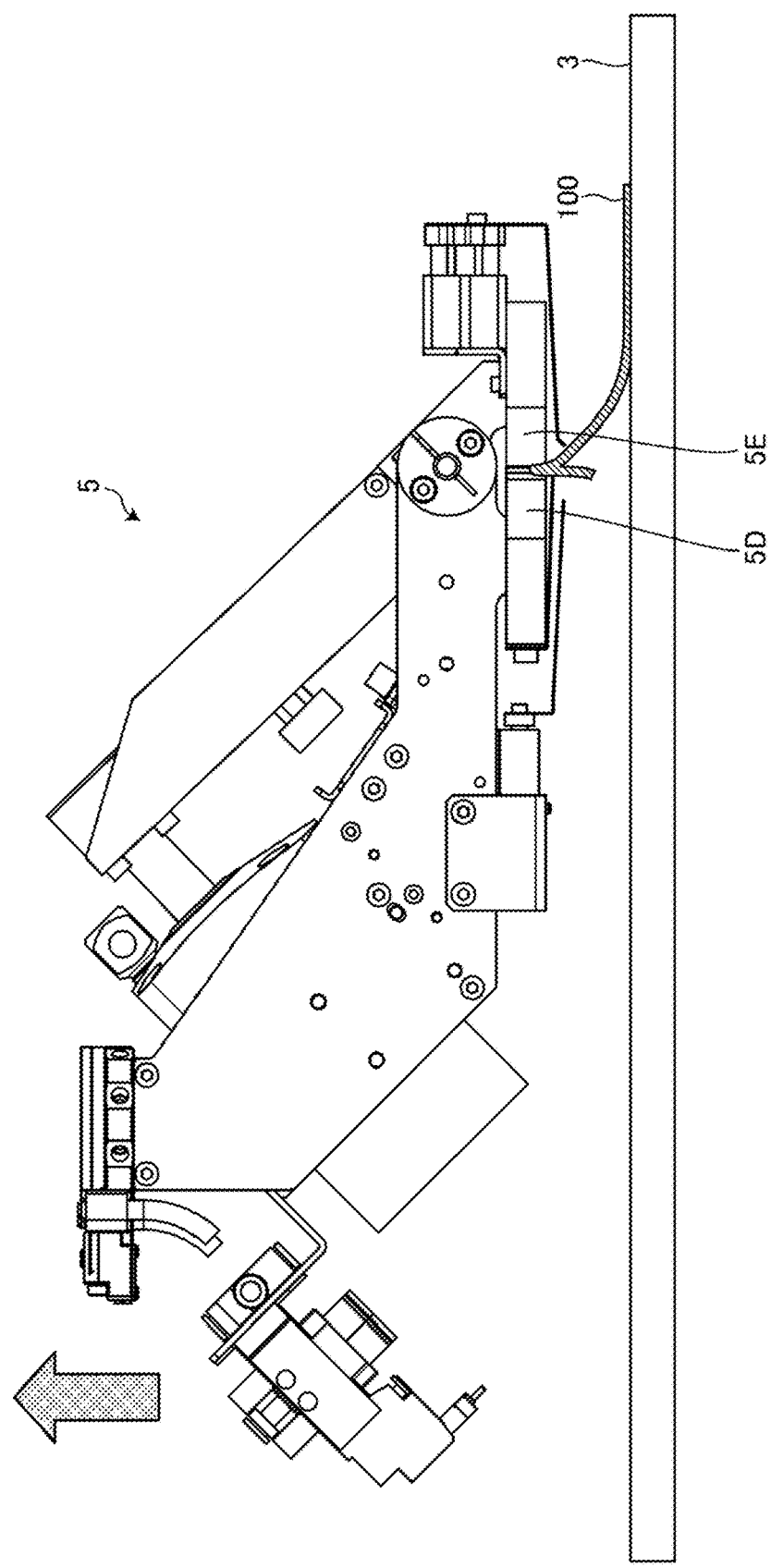
FIG. 14 is a diagram showing the operation of the folding assembly according to the embodiment.

After the scraping of the fabric 100 by the scraping member 5P is released, as shown in FIG. 14, the robot controller 16C controls the first robot manipulator 4A to move the folding assembly 5 upwards while the fabric 100 is pinched between the first hand 5D and the second hand 5E. The robot controller 16C moves the folding assembly 5 upwards so that the rear end portion of the fabric 100 is separated from the top plate 3.

Figure 15:
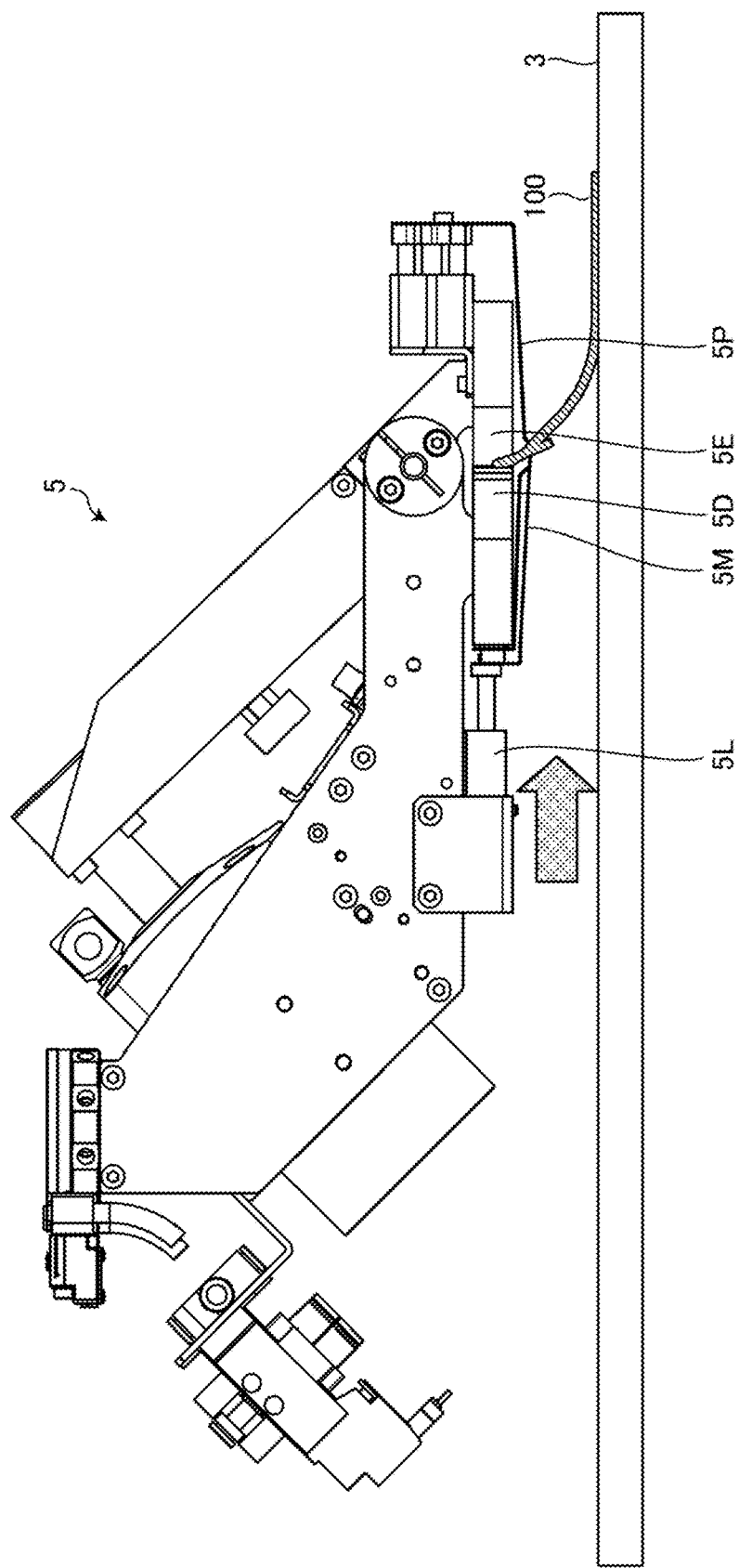
FIG. 15 is a diagram showing the operation of the folding assembly according to the embodiment.

After the folding assembly 5 is moved upwards, as shown in FIG. 15, the folding assembly controller 16D controls the folding-back cylinder 5L to move the folding-back member 5M forwards. By moving the folding-back member 5M forwards, the rear end portion of the fabric 100 is folded back forwards. When the fabric 100 is heated, the folding assembly controller 16D cools the fabric 100 using a cooling device (not shown). The cooling device may be, for example, a vacuum device configured to suction air from the lower surface of the top plate 3, or an air supply device configured to blow cooling air onto the fabric 100. By cooling the fabric 100 on which the crease is made, the crease is maintained for a long period of time.

Figure 16:
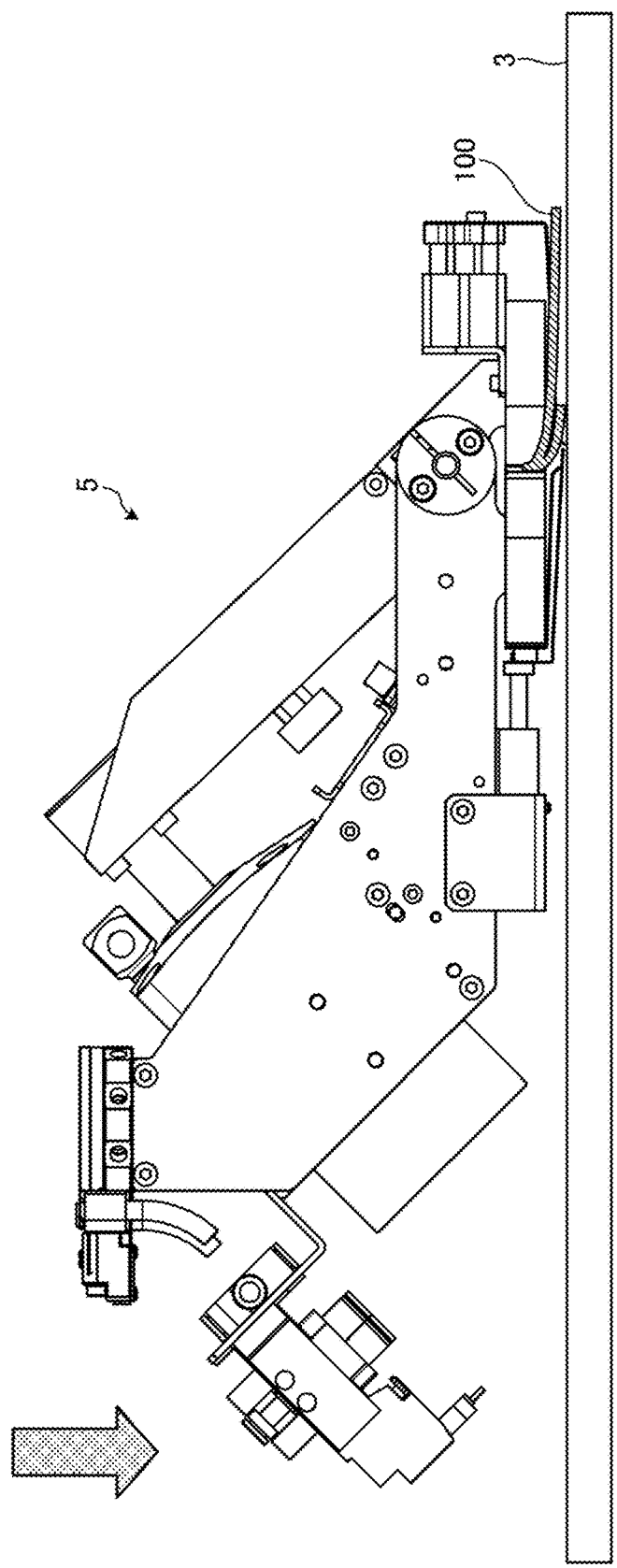
FIG. 16 is a diagram showing the operation of the folding assembly according to the embodiment.

After the rear end portion of the fabric 100 is folded back forwards, as shown in FIG. 16, the robot controller 16C controls the first robot manipulator 4A to move the folding assembly 5 downwards. The robot controller 16C lowers the folding assembly 5 to maintain a state in which the rear end portion of the fabric 100 is folded back in contact with the upper surface of the top plate 3.

Figure 17:
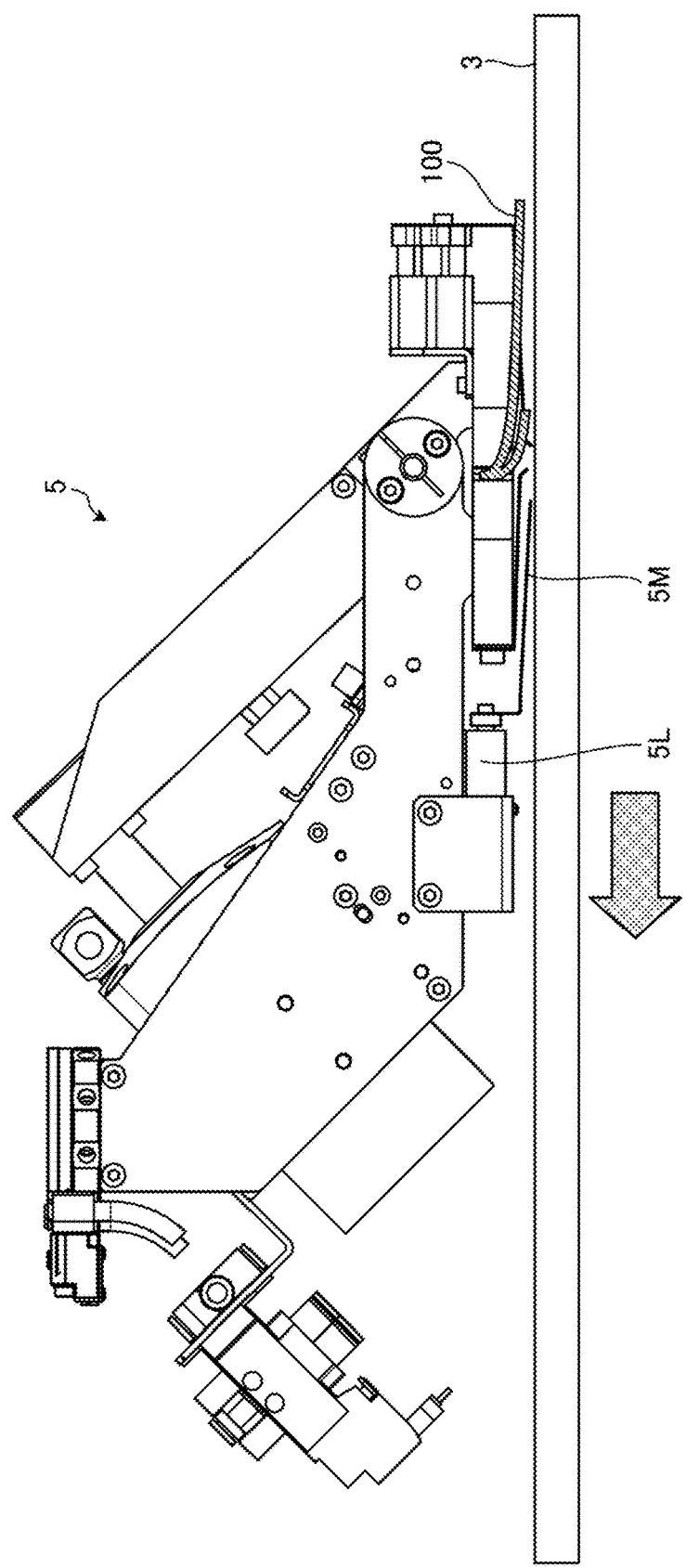
FIG. 17 is a diagram showing the operation of the folding assembly according to the embodiment.

After the folding assembly 5 is lowered, as shown in FIG. 17, the folding assembly controller 16D controls the folding-back cylinder 5L to move the folding-back member 5M rearwards. By moving the folding-back member 5M rearwards, the folding-back of the fabric 100 by the folding-back member 5M is released.

Figure 18:
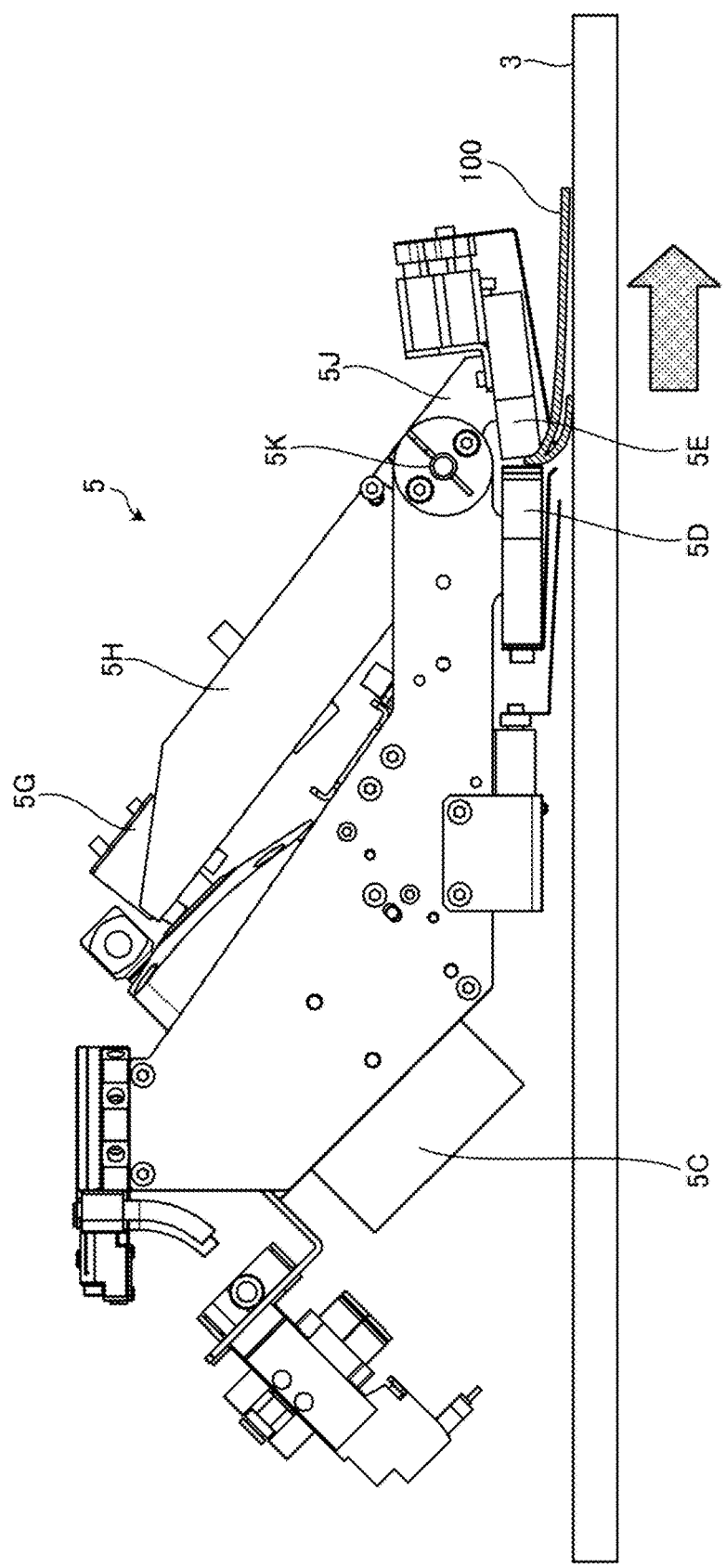
FIG. 18 is a diagram showing the operation of the folding assembly according to the embodiment.

After the folding-back of the fabric 100 by the folding-back member 5M is released, as shown in FIG. 18, the folding assembly controller 16D controls the pressurizing cylinder 5C to move the second hand 5E forwards. By moving the second hand 5E forwards, the pinching of the fabric 100 between the first hand 5D and the second hand 5E is released.

Figure 19:
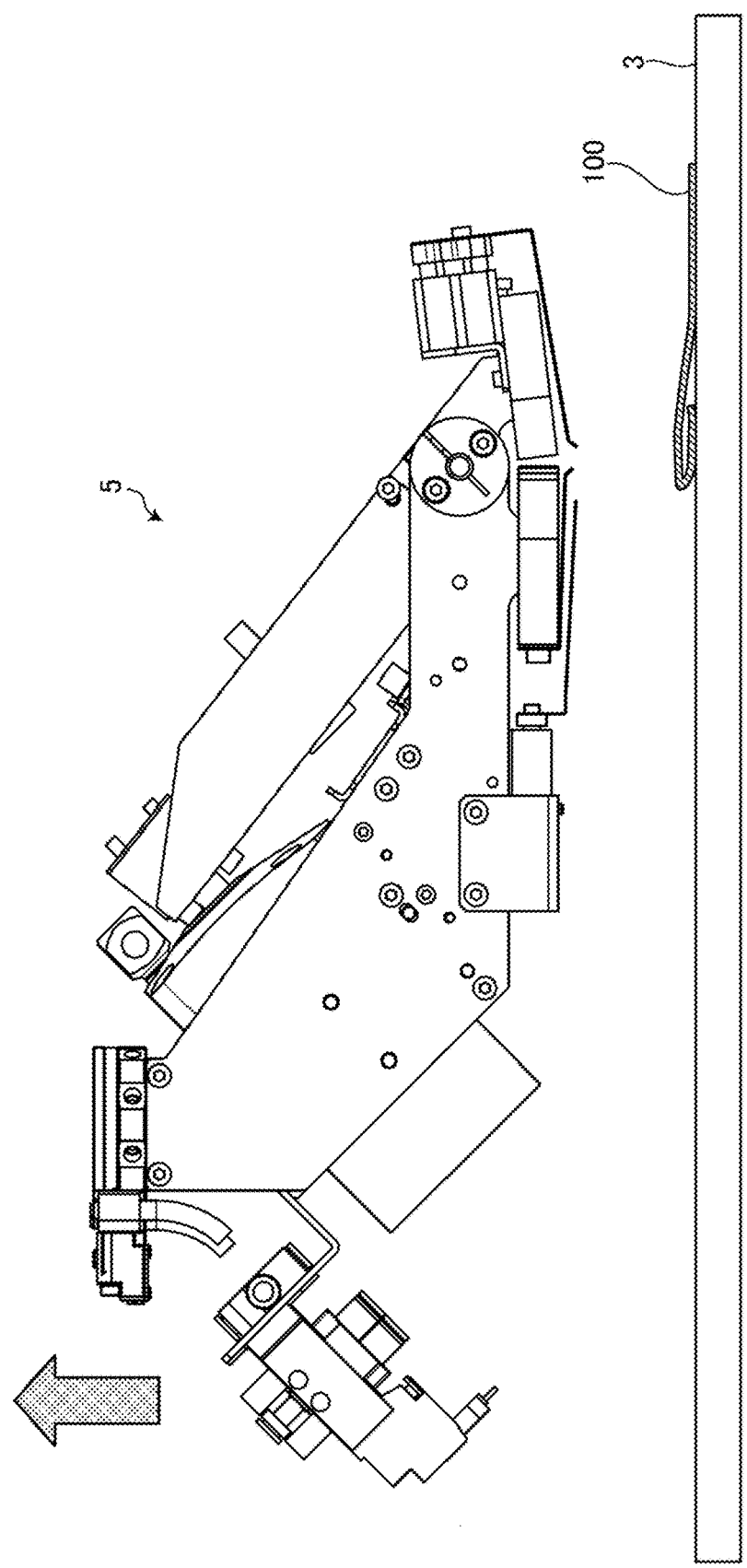
FIG. 19 is a diagram showing the operation of the folding assembly according to the embodiment.

After the pinching of the fabric 100 between the first hand 5D and the second hand 5E is released, as shown in FIG. 19, the robot controller 16C moves the folding assembly 5 upwards so that the folding assembly 5 is retreated from the fabric 100.

According to the above description, making a crease on the fabric 100 using the first robot manipulator 4A and the folding assembly 5 is completed.

After the crease is made on the fabric 100, the feeding assembly 6 and the sewing machine assembly 7 are controlled to form a seam along the crease.

[Effects]

As described above, in the embodiment, the sewing apparatus 1 (the creasing apparatus) includes the top plate 3 having the upper surface that supports the fabric 100, the robot manipulator 4, the folding assembly 5 that is mounted on the robot manipulator 4 and makes a crease on the fabric 100 by pinching the fabric 100 from above, and the control device 16 that controls the robot manipulator 4 and the folding assembly 5.

According to the embodiment, creasing of the fabric 100 is automatically made. Accordingly, clothing is efficiently produced. Since the folding assembly 5 is mounted on the robot manipulator 4, the folding assembly 5 can be moved to any position on the top plate 3. Therefore, the sewing apparatus 1 can make the crease on the fabric 100 at any position on the top plate 3.

The sewing apparatus 1 includes the camera 14 mounted on the robot manipulator 4. The camera 14 is capable of photographing the fabric 100. The control device 16 can calculate, based on image data of the fabric 100 acquired by the camera 14, a target portion of the fabric 100 on which the crease is to be made. The control device 16 can control the robot manipulator 4 to allow the target portion of the fabric 100 and the folding assembly 5 to face each other. Accordingly, the control device 16 can make the crease on the target portion of the fabric 100 by using the folding assembly 5.

The control device 16 controls the folding assembly 5 to allow the folding assembly 5 to pinch the target portion of the fabric 100 after the target portion of the fabric 100 and the folding assembly 5 face each other. Accordingly, the control device 16 can make the crease on the target portion of the fabric 100 by using the folding assembly 5.

The sewing apparatus 1 includes the heating device 17 that heats the top plate 3. The folding assembly 5 makes the crease on the fabric 100 heated by the heating device 17 with the top plate 3 interposed therebetween. As a result, the crease is firmly made on the fabric 100. Since the heating device 17 is not provided on the folding assembly 5 but on the top plate 3, the folding assembly 5 can be reduced in weight and simplified.

After the crease is made on the fabric 100, the fabric 100 is cooled to firmly make the crease on the fabric 100. The cooling device may be, for example, a vacuum device that suctions air from the lower surface of the top plate 3, or an air supply device that blows cooling air onto the fabric 100. The fabric 100 held by the folding assembly 5 is moved to a position at which the fabric 100 is heated by the heating device 17 and a position at which the fabric 100 is cooled by the cooling device, thereby firmly making the crease on the fabric 100. When a member in contact with the fabric 100 is formed of a material having high thermal conductivity in the folding assembly 5, heat of the heated fabric 100 escapes to the member, thereby making it possible to cool the fabric 100 using the member.

The folding assembly 5 includes the first hand 5D, and the second hand 5E that pinches the fabric 100 between the first hand 5D and the second hand 5E. By pinching the fabric 100 between the first hand 5D and the second hand 5E, the folding assembly 5 can make the crease on the fabric 100.

The folding assembly 5 includes the mountain folding member 5F disposed below the first hand 5D and the scraping member 5P disposed below the second hand 5E and configured to be movable toward or away from the mountain folding member 5F. The first hand 5D and the second hand 5E pinch the portion of the fabric 100 mountain-folded by the mountain folding member 5F and the scraping member 5P. The first hand 5D and the second hand 5E are rigid bodies and have large pressing surfaces. Since the first hand 5D and the second hand 5E are rigid bodies and have large pressing surfaces, the crease can be firmly made on the fabric 100. On the other hand, since the first hand 5D and the second hand 5E are rigid bodies, it may become difficult for the first hand 5D and the second hand 5E to lift the fabric 100 disposed on the upper surface of the top plate 3. In the embodiment, the fabric 100 disposed on the upper surface of the top plate 3 is lifted by the mountain folding member 5F and the scraping member 5P, and then the fabric 100 is pinched between the first hand 5D and the second hand 5E. Each of the mountain folding member 5F and the scraping member 5P is formed by an elastically deformable thin metal plate. The front end portion of the mountain folding member 5F is bent downwards, and the rear end portion of the scraping member 5P is bent downwards. Therefore, the mountain folding member 5F and the scraping member 5P can smoothly lift the fabric 100 disposed on the upper surface of the top plate 3.

The folding assembly 5 includes the folding-back member 5M that folds back the rear end portion of the fabric 100 pinched between the first hand 5D and the second hand 5E in the forward direction. After the rear end portion of the fabric 100 is folded back forwards, the pinching of the fabric 100 between the first hand 5D and the second hand 5E is released. As a result, a clean crease is made on the fabric 100.

The sewing apparatus 1 includes the feeding assembly 6 mounted on the second robot manipulator 4B and the sewing machine assembly 7 mounted on the third robot manipulator 4C. After the crease is made on the fabric 100 by the folding assembly 5, the control device 16 can control the second robot manipulator 4B, the feeding assembly 6, the third robot manipulator 4C, and the sewing machine assembly 7 to form a seam along the crease, Other Embodiments In the embodiment described above, the sewing apparatus 1 may include a steam device that sprays steam onto the fabric 100. The folding assembly 5 can firmly make a crease on the fabric 100 sprayed with steam.

What is claimed is:

1. A creasing apparatus comprising:
a top plate having an upper surface supporting a fabric;
a robot manipulator;
a folding assembly mounted on the robot manipulator and configured to make a crease on the fabric by pinching the fabric from above;
a control device configured to control the robot manipulator and the folding assembly; and a camera mounted on the robot manipulator and configured to be able to photograph the fabric, wherein the control device is configured to control the robot manipulator based on image data of the fabric acquired by the camera to allow a target portion of the fabric on which the crease is to be made and the folding assembly to face each other.

2. The creasing apparatus according to claim 1, wherein, after the target portion of the fabric and the folding assembly face each other, the control device is configured to control the folding assembly to allow the folding assembly to pinch the target portion of the fabric.

3. The creasing apparatus according to claim 1, further comprising a heating device configured to heat the top plate, wherein the folding assembly makes the crease on the fabric after the fabric is heated by the heating device with the top plate interposed therebetween.

4. The creasing apparatus according to claim 1, wherein the folding assembly includes a first hand, and a second hand configured to pinch the fabric between the first hand and the second hand.

5. The creasing apparatus according to claim 4, wherein the folding assembly further includes a mountain folding member disposed below the first hand, and a scraping member disposed below the second hand and movable to approach the mountain folding member or to be separated from the mountain folding member, and the first hand and the second hand pinch a portion of the fabric mountain-folded by the mountain folding member and the scraping member.

6. The creasing apparatus according to claim 5, wherein the folding assembly includes a folding-back member configured to fold back an end portion of the fabric pinched between the first hand and the second hand, and releases pinching of the fabric between the first hand and the second hand after the end portion of the fabric is folded back.

* * * * *